United States Patent
Gotou

(10) Patent No.: US 9,169,416 B2
(45) Date of Patent: *Oct. 27, 2015

(54) IMAGE FORMING METHOD AND IMAGE FORMED MATTER

(75) Inventor: Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 13/823,137

(22) PCT Filed: Sep. 29, 2011

(86) PCT No.: PCT/JP2011/073027
§ 371 (c)(1),
(2), (4) Date: Mar. 14, 2013

(87) PCT Pub. No.: WO2012/043874
PCT Pub. Date: Apr. 5, 2012

(65) Prior Publication Data
US 2013/0169724 A1    Jul. 4, 2013

(30) Foreign Application Priority Data
Sep. 30, 2010    (JP) .................................. 2010-221397

(51) Int. Cl.
*B41J 2/01* (2006.01)
*C09D 11/40* (2014.01)
(Continued)

(52) U.S. Cl.
CPC ............... *C09D 11/40* (2013.01); *B41J 2/2107* (2013.01); *B41J 2/2114* (2013.01);
(Continued)

(58) Field of Classification Search
CPC ...... C09D 11/30; C09D 11/322; C09D 11/54; C09D 11/005; C09D 11/326; C09D 11/38; C09D 11/40; B41J 2/2107; B41J 2/2114; B41J 11/0015; B41M 5/0017; B41M 5/0011; B41M 7/0018

USPC .................................................... 347/95–100
See application file for complete search history.

(56) References Cited

U.S. PATENT DOCUMENTS 6,439,708 B1    8/2002    Kato et al.
7,919,544 B2    4/2011    Matsuyama et al.
(Continued)

FOREIGN PATENT DOCUMENTS

JP    2001-199151    7/2001
JP    2002-173621    6/2002
(Continued)

OTHER PUBLICATIONS

International Search Report Issued Dec. 13, 2011 in PCT/JP11/73027 Filed Sep. 29, 2011.
(Continued)

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

An image forming method including: applying a pre-treatment liquid to a recording medium; and applying a stimulus to an inkjet ink to jet the inkjet ink onto the recording medium, onto which the pre-treatment liquid has been applied, so as to form an image on the recording medium, wherein the pre-treatment liquid contains a water-soluble aliphatic organic acid, a water-soluble organic monoamine compound, a water-soluble organic solvent, and water, and the inkjet ink contains an aqueous pigment dispersion in which a pigment is dispersed with an anionic dispersant or nonionic dispersant, a water-soluble organic solvent, an anionic ionomer-based aqueous urethane resin, a surfactant, a penetrating agent, and water, and wherein the pre-treatment liquid contains 1 molar equivalent or higher of the water-soluble organic monoamine compound relative to an acid group contained in the water-soluble aliphatic organic acid.

20 Claims, 1 Drawing Sheet

(51) Int. Cl.
- *B41J 2/21* (2006.01)
- *B41M 5/00* (2006.01)
- *C09D 11/326* (2014.01)
- *C09D 11/38* (2014.01)
- *C09D 11/54* (2014.01)
- *B41M 7/00* (2006.01)

(52) U.S. Cl.
CPC .......... *B41M 5/0017* (2013.01); *C09D 11/326* (2013.01); *C09D 11/38* (2013.01); *C09D 11/54* (2013.01); *B41M 7/0018* (2013.01)

(56) References Cited

U.S. PATENT DOCUMENTS

| | | |
|---|---|---|
| 2007/0188571 A1 | 8/2007 | Tokita et al. |
| 2007/0197685 A1 | 8/2007 | Aruga et al. |
| 2008/0233363 A1 | 9/2008 | Goto |
| 2009/0098312 A1 | 4/2009 | Goto et al. |
| 2009/0176070 A1 | 7/2009 | Goto et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2012/0128949 A1 | 5/2012 | Goto |
| 2013/0070017 A1 | 3/2013 | Fujii et al. |

FOREIGN PATENT DOCUMENTS

| | | |
|---|---|---|
| JP | 2003-246135 | 9/2003 |
| JP | 2006-035689 | 2/2006 |
| JP | 2006-199896 | 8/2006 |
| JP | 2006-248049 | 9/2006 |
| JP | 2007-216423 | 8/2007 |
| JP | 2008-95089 A | 4/2008 |
| JP | 2008-163238 A | 7/2008 |
| JP | 2009-19198 A | 1/2009 |
| JP | 2009-248468 A | 10/2009 |
| JP | 2009-286117 A | 12/2009 |
| WO | 00/06390 A1 | 2/2000 |

OTHER PUBLICATIONS

U.S. Appl. No. 13/683,000, filed Nov. 21, 2012, Gotou, et al.
U.S. Appl. No. 13/680,386, filed Nov. 19, 2012, Gotou, et al.

IMAGE FORMING METHOD AND IMAGE FORMED MATTER

CROSS-REFERENCE TO RELATED APPLICATIONS

This application is a National Stage of PCT/JP2011/073027 filed on Sep. 29, 2011. This application is based upon and claims the benefit of priority to Japanese Application No. 2010-221397 filed on Sep. 30, 2010.

TECHNICAL FIELD

The present invention relates to an image forming method capable of recording high quality images on plain paper, printing paper, etc. by an ink jetting system, and an image formed matter using the image forming method.

BACKGROUND ART

An inkjet recording method has become rapidly popular in these days because it can record color images on plain paper and its running cost is low. However, the inkjet recording method has problems that image defects typified by character feathering (hereinafter, referred to as feathering) easily occur depending on the combination of an ink with a recording medium used, causing significant degradation in image quality. Thus, an attempt has been made such that ink permeability is suppressed so as to prevent feathering. However, in this case, since the drying properties of an ink degrade, hands are stained by the ink of a recorded matter and an image smear occurs.

When a color image is recorded by the inkjet recording method, different color inks are sequentially superimposed one another. As a result, color inks bleed and are mixed together at the boundary parts of colors (hereinafter, referred to as color bleeding), and image quality significantly degrades. To solve these problems, attempts have been made to prevent the color bleeding by increasing ink permeability. However, in this case, since a colorant penetrates inside the recording medium, image density degrades, and ink significantly strikes through to the back surface of the recording medium, failing to perform double face printing in a suitable manner.

To solve these problems and improve image quality, image forming methods using a pre-treatment liquid and an ink have been proposed.

Patent Literature 1 discloses a method of forming a coloring part on a recording medium using a liquid composition containing fine particles in a dispersion state, wherein the surfaces of the particles are charged with a polarity opposite to that of an aqueous ink. This method definitely effects on aggregation and adsorption of a colorant, but is unable to achieve a sufficient effect on the suppression of feathering, and color bleeding. Moreover, in this method, another problem occurs in terms of fixing ability of an aqueous ink. Specifically, the liquid composition and the aqueous ink are attached to the recording medium and then a vehicle (a liquid component in the liquid composition or aqueous ink) permeates the recording medium, thereby accumulating a mixture of the fine particles with the colorant on a surface of the recording medium. The thus formed accumulation is mechanically vulnerable, and may be easily removed by rubbing by hand and the like. Therefore, ink smears a user's hand and backface of stacked printed matter, resulting in failure of poor rubfastness.

Patent Literature 2 discloses an inkjet recording method in which a first liquid containing polymer fine particles and an ink composition are attached onto a recording medium to perform printing, in order to improving rubfastness of an image formed matter. According to the method, a large amount of polymer particles is necessary to obtain a sufficient rubfastness. However, the addition of a large amount of polymer particles may cause side effects, such as decrease in ejection stability and storage stability, viscosity increase or the like. Thus, problems have not been solved yet.

Patent Literature 3 discloses an inkjet liquid composition and an inkjet inkset, wherein the inkjet liquid composition contains an organic acid having an acid dissociation constant pKa of 4.5 or lower, an organic amine compound, an aqueous solvent and water, and a ratio of the amount of the organic acid and the amount the organic amine compound is specified, in order to improve storage stability of a pre-treatment liquid. Use of this inkset enables a color material of the ink to be effectively aggregated, since pH is maintained in an acid when the inkjet liquid composition and the ink are mixed. However, although the disclosed liquid composition achieves to attain storage stability, the disclosed inkset does not achieve less smear adhesion (also referred to as excellent rubfastness) of images immediately after printing since a colorant is aggregated and accumulates on a surface of a recording medium.

Thus, in the case where suppression of both feathering and color bleeding on an image formed matter is attempted to achieve by the conventional image forming method using the pre-treatment liquid in combination with the ink, the storage stability of the pre-treatment liquid degrades and the smear adhesion of the resulting images degrades.

CITATION LIST

Patent Literature

PTL 1: Japanese Patent Application Laid-Open (JP-A) No. 2001-199151
PTL 2: International Publication No. WO 00/06390
PTL 3: JP-A No. 2006-35689

SUMMARY OF INVENTION

Technical Problem

The present invention aims to provide an image forming method which can form an image without occurring feathering and color bleeding and having less smear adhesion (also referred to as excellent rubfastness) on a recording medium having no coat layer, such as copy paper, and to provide an image formed matter using the image forming method.

Solution to Problem

Means for solving the problems are as follows.
<1> An image forming method including: applying a pre-treatment liquid to a recording medium; and applying a stimulus to an inkjet ink to jet the inkjet ink onto the recording medium, onto which the pre-treatment liquid has been applied, so as to form an image on the recording medium, wherein the pre-treatment liquid contains a water-soluble aliphatic organic acid, a water-soluble organic monoamine compound, a water-soluble organic solvent, and water, and the inkjet ink contains an aqueous pigment dispersion in which a pigment is dispersed with an anionic dispersant or nonionic dispersant, a water-soluble organic solvent, an anionic ionomer-based aqueous urethane resin, a surfactant, a penetrating agent, and water, and wherein the pre-treatment liquid contains 1 molar equivalent or higher of the water-soluble organic monoamine compound relative to an acid group contained in the water-soluble aliphatic organic acid.
<2> The image forming method according to <1>, wherein the anionic ionomer-based aqueous urethane resin is a polyester urethane resin or a polyether urethane resin.
<3> The image forming method according to any one of <1> and <2>, wherein the water-soluble aliphatic organic acid is a compound represented by General Formula (I);

General Formula (I)

where, $R^1$ denotes a hydrogen atom or a methyl group substituted by a carboxyl group; and $R^2$ denotes a methyl group, a methyl group substituted by a carboxyl group, or a methyl group substituted by a hydroxyl group and a carboxyl group.
<4> The image forming method according to any one of <1> to <3>, wherein the water-soluble organic monoamine compound is selected from a group consisting of compounds represented by General Formulae (IV) and (V):

General Formula (IV)

where, $R^3$, $R^4$, and $R^5$ each denote a hydrogen atom, an alkoxy group having 1 to 4 carbon atoms, an alkyl group having 1 to 8 carbon atoms, a hydroxyethyl group or a hydroxypropyl group, with the proviso that the compound where all of $R^3$, $R^4$, and $R^5$ are hydrogen atoms is excluded;

General Formula (V)

where, $R^6$ denotes a hydroxymethyl group; $R^7$ denotes a methyl group, an ethyl group or a hydroxymethyl group; $R^8$ denotes a hydrogen atom, an alkyl group having 1 to 4 carbon atoms or a hydroxymethyl group.
<5> The image forming method according to any one of <1> to <4>, wherein the pre-treatment liquid further contains an aliphatic organic acid salt compound, or an inorganic metal salt compound.
<6> The image forming method according to any one of <1> to <5>, wherein the pre-treatment liquid has a static surface tension of 30 mN/m or lower at 25° C.
<7> The image forming method according to any one of <1> to <6>, wherein the inkjet ink has a static surface tension of 20 mN/m to 35 mN/m at 25° C.
<8> An image formed matter, including: a recording medium; and an image formed on the recording medium, wherein the image is formed on the recording medium by the image forming method according to any one of <1> to <7>.

Advantageous Effects of Invention

According to the present invention, these conventional problems can be solved, and achieve the object. The present invention can provide an image forming method which can form an image without occurring feathering and color bleeding and without impairing less smear adhesion on a recording medium having no coat layer, such as copy paper, and an image formed matter using the image forming method.

Figure 1:
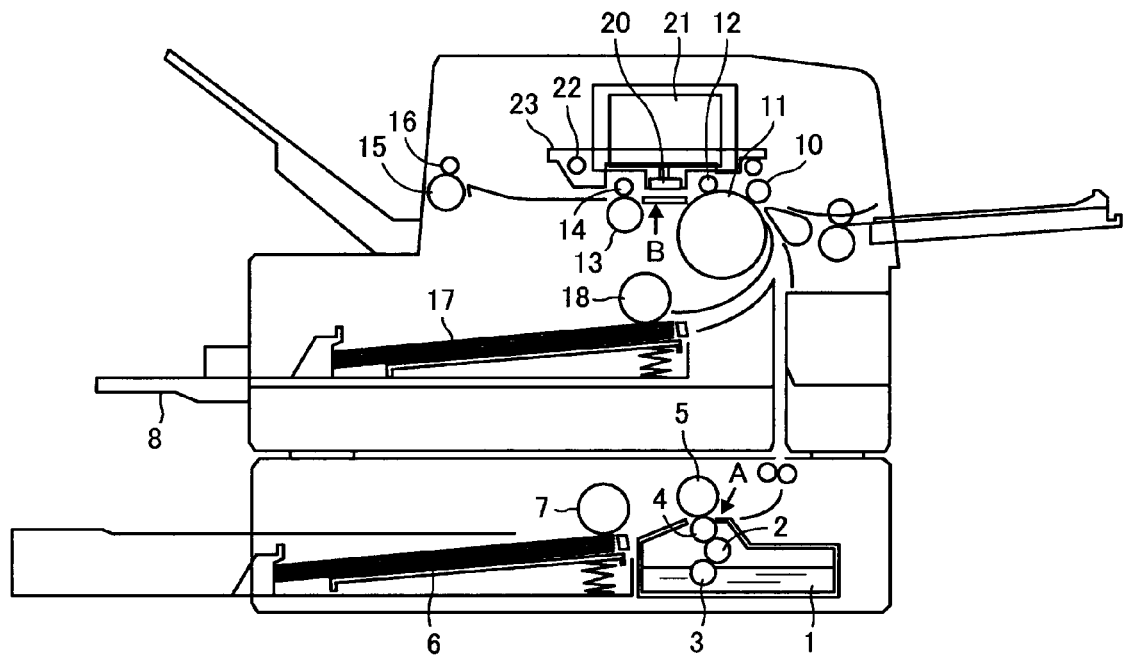
FIG. 1 is a schematic construction diagram showing an example of an inkjet recording apparatus.

DESCRIPTION OF EMBODIMENTS (Image Forming Method)
An image forming method of the present invention includes a pre-treatment step of applying a pre-treatment liquid to a recording medium; and an ink jetting step of applying a stimulus to an inkjet ink to jet the inkjet ink onto the recording medium, onto which the pre-treatment liquid has been applied, so as to form an image on the recording medium, and if necessary further includes other steps, wherein the pre-treatment liquid contains a water-soluble aliphatic organic acid, a water-soluble organic monoamine compound, a water-soluble organic solvent, and water, and the inkjet ink contains an aqueous pigment dispersion in which a pigment is dispersed with an anionic dispersant or nonionic dispersant, a water-soluble organic solvent, an anionic ionomer-based aqueous urethane resin, a surfactant, a penetrating agent, and water.
<Pre-Treatment Liquid>
The pre-treatment liquid contains a water-soluble aliphatic organic acid, a water-soluble organic monoamine compound, a water-soluble organic solvent, and water, and if necessary, further contains other components.
The pre-treatment liquid contains a water-soluble aliphatic organic acid and has a property to aggregate water-dispersible colorants. Here, the term "aggregate" means that water-dispersible colorant particles are adsorbed to each other to come together. This phenomenon can be confirmed using a particle size distribution measuring device. When an ion material such as a water-soluble aliphatic organic acid is added to the pre-treatment liquid, the ions are adsorbed to surface electric charges of the water-dispersible colorant, whereby the surface electric charges are neutralized and an aggregation effect is reinforced by inter molecular attraction forces, to thereby make the water-dispersible colorant aggregate. As an example of the method of confirming the aggregation of the water-dispersible colorant, there may be exemplified a method in which whether or not colorant particles aggregate is confirmed instantly when 30 mL of the pre-treatment liquid is added to 5 μL of an inkjet ink (hereinafter, also referred to as ink) containing 5% by mass of the water-dispersible colorant.
—Water-Soluble Aliphatic Organic Acid—
As the water-soluble aliphatic organic acid, a carboxyl group-containing-water-soluble aliphatic organic acid and a sulfo group-containing-water-soluble aliphatic organic acid are preferably used. Here, the term "aliphatic" means that a straight-chain or branched hydrocarbon group is contained, and the hydrocarbon group may be a saturated hydrocarbon group and may be an unsaturated hydrocarbon group. The number of carbon atoms in the water-soluble aliphatic organic acid is not particularly limited. It is, however, in terms of the solubility in solvents, preferably 2 to 6 per molecule, and more preferably 2 to 4 per molecule. The number of acid groups in the water-soluble aliphatic organic acid is, in terms of the image density, preferably 3 or less per molecule, more preferably 2 or less per molecule, and even more preferably 1 per molecule.

As the water-soluble aliphatic organic acid, a carboxyl group-containing-water-soluble aliphatic organic acid represented by any one of the following General Formulae (I) to (III) is preferably used. Among them, the organic acid represented by General Formula (I) is particularly preferable.

General Formula (I)

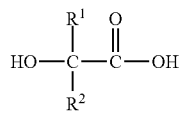

in General Formula (I), $R^1$ denotes a hydrogen atom or a methyl group substituted by a carboxyl group; and $R^2$ denotes a methyl group, a methyl group substituted by a carboxyl group, or a methyl group substituted by a hydroxyl group and a carboxyl group.

General Formula (II)

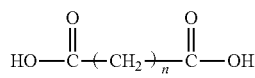

in General Formula (II), n denotes an integer of 1 to 4.

General Formula (III)

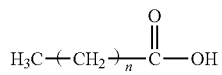

in General Formula (III), n denotes an integer of 0 to 4.

Examples of the compounds represented by General Formula (I) include lactic acid (pKa: 3.83), malic acid (pKa: 3.4), citric acid (pKa: 3.13), and tartaric acid (pKa: 2.93).

Examples of the compounds represented by General Formula (II) include oxalic acid (pKa: 1.04), malonic acid (pKa: 2.05), succinic acid (pKa: 4.21), and adipic acid (pKa: 4.42).

Examples of the compounds represented by General Formula (III) include acetic acid (pKa: 4.76), propionic acid (pKa: 4.87), butyric acid (pKa: 4.82), and valeric acid (pKa: 4.82).

Examples of the carboxyl group-containing water-soluble aliphatic organic acids other than the compounds represented by any one of General Formulae (I) to (III) include gluconic acid (pKa: 2.2), pyruvic acid (pKa: 2.49), and fumaric acid (pKa: 3.02).

As the sulfo group-containing water-soluble aliphatic organic acid, taurine is preferably used.

The amount of the water-soluble aliphatic organic acid in the total amount of the pre-treatment liquid is preferably 1% by mass to 40% by mass, and more preferably 3% by mass to 30% by mass. When the addition amount is more than 40% by mass, it may be difficult to add water-soluble organic monoamine in an amount required for neutralization due to the formulation of the pre-treatment liquid. When the addition amount is less than 1% by mass, the effect of improving image quality may be reduced.

—Water-Soluble Organic Monoamine Compound—

The pre-treatment liquid used in the present invention preferably contains a water-soluble organic monoamine compound with a view to control the permeability of ink and to prevent corrosion of metal. The water-soluble organic monoamine compounds may be any of primary, secondary, tertiary, quaternary amines and salts thereof. Note that in the present invention, the term quaternary amine means a compound in which a nitrogen atom is substituted with four alkyl groups. The number of carbon atoms in the water-soluble organic monoamine compound is not particularly limited, however, it is preferably, in terms of the solubility in solvents, 2 to 12 per molecule, and more preferably 2 to 6 per molecule.

As the water-soluble organic monoamine compounds, compounds represented by one of the following General Formulae (IV) and (V) are preferably used.

General Formula (IV)

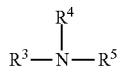

in General Formula (IV), $R^3$, $R^4$, and $R^5$ each denote a hydrogen atom, an alkoxy group having 1 to 4 carbon atoms, an alkyl group having 1 to 8 carbon atoms, a hydroxyethyl group or a hydroxypropyl group, with the proviso that the compound where all of $R^3$, $R^4$, and $R^5$ are hydrogen atoms is excluded.

General Formula (V)

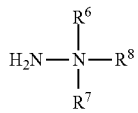

in General Formula (V), $R^6$ denotes a hydroxymethyl group; $R^7$ denotes a methyl group, an ethyl group or a hydroxymethyl group; $R^8$ denotes a hydrogen atom, an alkyl group having 1 to 4 carbon atoms or a hydroxymethyl group.

Examples of the compounds represented by General Formula (IV) include dimethylamine, ethylamine, diethylamine, triethylamine, propylamine, dipropylamine, isopropylamine, diisopropylamine, n-butylamine, sec-butylamine, t-butylamine, di-n-butylamine, tributylamine, pentylamine, dipentylamine, tripentylamine, 2-ethylhexylamine, di-2-ethylhexylamine, di-n-octylamine, tri-n-octylamine, 1-amino-2-propanol, 3-amino-1-propanol, N-methylethanolamine, N,N-diethylethanolamine, N,N-dimethylethanolamine, N-methyldiethanolamine, diethanolamine, triethanolamine, triisopropanolamine, N-butyldiethanolamine, and N,N-dibutylethanolamine.

Examples of the compounds represented by General Formula (V) include 2-amino-2-ethyl-1,3-propanediol, 2-amino-2-(hydroxymethyl)-1,3-propanediol, 2-amino-2-methyl-1,3-propanediol, and 2-amino-2-methyl-1-propanol.

Examples of the water-soluble organic monoamine compounds other than the compounds represented by one of General Formulae (IV) and (V) include allylamine, diallylamine, 3-ethoxypropylamine, 2-(2-aminoethoxy)ethanol, 3-methoxypropylamine, and choline.

The amount added of the water-soluble organic monoamine compound is preferably 1.0 mol to 1.5 mol, and more preferably 1.0 mol to 1.2 mol relative to 1 mol of the acid group contained in the water-soluble aliphatic organic acid. When the amount added of the water-soluble organic monoamine compound is less than 1.0 mol, white streaks may occur due to dot shrinkage of an image formed matter. When the amount added of the water-soluble organic monoamine compound is more than 1.5 mol, the water-soluble organic monoamine compound released in the treatment liquid may accelerate permeation of the inkjet ink to cause a decrease in image density.

Since the water-soluble organic monoamine compound is necessary for producing a salt neutralized together with the water-soluble aliphatic organic acid and it is important for the pre-treatment liquid to have a pH of 5 or higher, it is necessary to suitably control the amount of the water-soluble organic monoamine compound according to the molecular weight of the water-soluble organic monoamine compound or water-soluble aliphatic organic acid.

—Water-Soluble Organic Solvent—

The pre-treatment liquid used in the present invention preferably contains a water-soluble organic solvent with a view to control the permeability of ink and to prevent corrosion of metal. Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

The water-soluble organic solvents retain a large amount of water therein even when the water in the pre-treatment liquid evaporates and reaches an equilibrium state, thereby imparting flowability to the pre-treatment liquid. In this case, by using a water-soluble organic solvent having a high equilibrium water content as the water-soluble organic solvent, it is possible to prevent an excessive increase in viscosity of the ink even when the water in the inkjet treatment liquid evaporates and reaches an equilibrium state.

As the water-soluble organic solvent having a high-equilibrium water content, water-soluble organic solvent having an equilibrium water content of 30% by mass or more is preferable, 40% by mass or more is more preferable, at a temperature of 23° C. and 80% RH (hereinafter, referred to as "water-soluble organic solvent A"). Note that the term "equilibrium water content" means a water content when a mixture of a water-soluble organic solvent and water is released into the air at a certain temperature and a certain humidity, and the evaporation of water in the solution and absorption of water in the air into the water-soluble organic solvent is in an equilibrium state. More specifically, an equilibrium water content can be measured using a saturated aqueous potassium chloride solution and a desiccator. The internal temperature of the desiccator is maintained at 23° C.±1° C. and the internal humidity thereof is maintained at 80%±3% RH. Then, each sample of aqueous organic solvents is weighed 1 g and poured in a petri dish, and the petri dish is placed in the desiccator and stored until there is no more change in mass of the sample, and an equilibrium water content of the sample can be determined by the following equation.

$$\text{Equilibrium Water Content (\%)} = \frac{\text{Amount of water absorbed into organic solvent}}{\text{Amount of organic solvent} + \text{Amount of water absorbed into organic solvent}} \times 100$$

As the water-soluble organic solvent A preferably used in the present invention, polyhydric alcohols having an equilibrium water content of 30% by mass or more at a temperature of 23° C. and 80% RH are used. Specific examples of such water-soluble organic solvent A include diethylene glycol (boiling point (bp): 245° C., 43% by mass), triethylene glycol (bp: 285° C., 39% by mass), tetraethylene glycol (bp: 324° C. to 330° C., 37% by mass), 1,3-butanediol (bp: 203° C. to 204° C., 35% by mass), glycerin (bp: 290° C., 49% by mass), diglycerin (bp: 270° C./20 hPa, 38% by mass), 1,2,3-butanetriol (bp: 175° C./33 hPa, 38% by mass), and 1,2,4-butanetriol (bp: 190° C. to 191° C./24 hPa, 41% by mass). Among them, 1,3-butanediol and glycerin are particularly preferably used because when these materials contain water, the viscosity of these compounds decreases, and the pigment dispersion can be stably maintained without aggregation.

It is desirable to use the water-soluble organic solvent A in an amount of 50% by mass or more relative to the total amount of the water-soluble organic solvents used, because the ejection stability can be secured, and the resulting ink is excellent in preventing adhesion of waste ink in a maintaining device of the ink ejection apparatus.

The pre-treatment liquid used in the present invention may be used in combination with a water-soluble organic solvent having an equilibrium water content less than 30% by mass at a temperature of 23° C. and 80% RH (hereinafter, called "water-soluble organic solvent B"), instead of a part of or in addition to the water-soluble organic solvent A. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other water-soluble organic solvents.

Specific examples of the polyhydric alcohols of the water-soluble organic solvent B include ethylene glycol (bp: 196° C. to 198° C.), polyethylene glycol (viscous liquid to solid), propylene glycol (bp: 187° C.), dipropylene glycol (bp: 232° C.), tripropylene glycol (bp: 267° C.), polypropylene glycol (bp: 187° C.), 3-methyl-1,3-butanediol (bp: 203° C.), 1,5-pentanediol (bp: 242° C.), 2-methyl-2,4-pentanediol (bp: 197° C.), hexylene glycol (bp: 197° C.), 1,6-hexanediol (bp: 253° C. to 260° C.), 1,2,6-hexanetriol (bp: 178° C.), trimethylolethane (solid, melting point (mp): 199° C. to 201° C.), and trimethylolpropane (solid, mp: 61° C.).

Examples of the polyhydric alcohol alkyl ethers include ethylene glycol monoethylether (bp: 135° C.), ethylene glycol monobutylether (bp: 171° C.), diethylene glycol monomethylether (bp: 194° C.), diethylene glycol monoethylether (bp: 197° C.), diethylene glycol monobutylether (bp: 231° C.), ethylene glycol mono-2-ethylhexylether (bp: 229° C.), and propylene glycol monoethylether (bp: 132° C.).

Examples of the polyhydric alcohol aryl ethers include ethylene glycol monophenyl ether (bp: 237° C.), and ethylene glycol monobenzyl ether.

Examples of the nitrogen-containing heterocyclic compounds include 2-pyrrolidone (bp: 250° C., mp: 25.5° C., 47% by mass to 48% by mass), N-methyl-2-pyrrolidone (bp: 202° C.), 1,3-dimethyl-2-imidazolidionone (bp: 226° C.), ε-caprolactam (bp: 270° C.), and γ-butyrolactone (bp: 204° C. to 205° C.).

Examples of the amides include formamide (bp: 210° C.), N-methylformamide (bp: 199° C. to 201° C.), N,N-dimethylformamide (bp: 153° C.), and N,N-diethylformamide (bp: 176° C. to 177° C.).

Examples of the amines include monoethanolamine (bp: 170° C.), dimethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyl diethylamine (bp: 169° C.).

Examples of the sulfur-containing compounds include dimethylsulfoxide (bp: 139° C.), sulfolane (bp: 285° C.), and thiodiglycol (bp: 282° C.).

As other water-soluble organic solvents, saccharides are preferable. Examples of the saccharides include monosaccharides, disaccharides, oligosaccharides (including trisaccharides and tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include materials existing widely in nature, such as α-cyclodextrin and cellulose. Derivatives of these saccharides include reducing sugars of saccharides (for example, sugar alcohol, which is represented by the general formula: $HOCH_2(CHOH)_nCH_2OH$, where n is an integer of 2 to 5), oxidized sugars (for example, aldonic acids and uronic acids), amino acids, and thio acids. Among them, sugar alcohol is preferable. Specific examples of sugar alcohol include maltitol and sorbitol.

The amount of the water-soluble organic solvent contained in the pre-treatment liquid is suitably selected depending on the intended purpose without any restriction. It is preferably 10% by mass to 80% by mass, and more preferably 15% by mass to 60% by mass. When the amount of the water-soluble organic solvent is more than 80% by mass, the recording medium after pre-treatment may be hard to be dried depending on the type of the water-soluble organic solvent. When the amount is less than 10% by mass, water in the pre-treatment liquid evaporates in the pre-treatment liquid application step, etc., possibly causing significant change in the composition of the pre-treatment liquid.

—Aliphatic Organic Acid Salt Compound, Inorganic Metal Salt Compound—

When an aliphatic organic acid salt compound or an inorganic metal salt compound is added to the pre-treatment liquid used in the present invention, the pigment is likely to remain on the surface of a recording medium to enhance the salting-out effect, whereby the image density can be increased.

Examples of the aliphatic organic acid salt compound of the organic acid include sodium L-aspartate, magnesium L-aspartate, calcium ascorbate, sodium L-ascorbate, sodium succinate, disodium succinate, diammonium succinate, aluminum citrate, potassium citrate, calcium citrate, tripotassium citrate, trisodium citrate, triammonium citrate, disodium citrate, diammonium citrate, sodium lactate, potassium lactate, calcium lactate, magnesium lactate, aluminum lactate, ammonium lactate, zinc lactate, potassium tartrate, calcium tartrate, sodium DL-tartrate, and sodium potassium tartrate.

Examples of the inorganic metal salt compound include magnesium sulfate, aluminum sulfate, manganese sulfate, nickel sulfate, iron(II) sulfate, copper (II) sulfate, zinc sulfate, iron(II) nitrate, iron(III) nitrate, cobalt nitrate, calcium nitrate, strontium nitrate, copper(II) nitrate, nickel(II) nitrate, zinc(II) nitrate, manganese (II) nitrate, nickel(II) chloride, calcium chloride, tin(II) chloride, strontium chloride, barium chloride, and magnesium chloride, sodium sulfate, potassium sulfate, lithium sulfate, sodium hydrogen sulfate, potassium hydrogen sulfate, sodium nitrate, potassium nitrate, sodium carbonate, potassium carbonate, sodium carbonate, potassium hydrogen carbonate, sodium chloride, and potassium chloride.

The amount of the aliphatic organic acid salt compound or the inorganic metal salt compound in the total amount of the pre-treatment liquid is preferably 0.1% by mass to 30% by mass, and more preferably 1% by mass to 20% by mass. When the amount thereof is more than 30% by mass, the aliphatic organic acid salt compound may be insufficiently dissolved in the pre-treatment liquid and precipitated. When the amount thereof is less than 0.1% by mass, the effect of improving image density may be reduced.

—Surfactant—

In the pre-treatment liquid used in the present invention, a surfactant can be incorporated for improving the wettability of the surface of recording medium, and the image density and color saturation of image formed matters and reducing white spots therein. In this case, to improve the wettability of the surface of recording medium and the ink permeability, it is preferable to adjust the static surface tension of the pre-treatment liquid to 30 mN/m or lower (25° C.) with the surfactant.

Examples of the surfactant include nonionic surfactants, anionic surfactants, betaine surfactant, silicone surfactants, and fluorochemical surfactants. Particularly, silicone surfactants and fluorochemical surfactants, each of which can reduce the static surface tension to 30 mN/m or lower, are preferably used. These surfactants may be used alone or in combination.

The fluorosurfactant preferably has 2 to 16 carbon atoms substituted with a fluorine atom, more preferably 4 to 16 carbon atoms substituted with a fluorine atom. When the numbers of the carbon atoms substituted with a fluorine atom are less than 2, such fluorosurfactant may not give any effect. When the numbers thereof are more than 16, problems may occur in storage stability of the pre-treatment liquid.

Examples of the fluorosurfactant include nonionic fluorosurfactants, anionic fluorosurfactants, amphoteric fluorosurfactants, and oligomer fluorosurfactants.

Examples of the nonionic fluorosurfactants include perfluoroalkyl phosphoric acid esterified compounds, perfluoroalkylethylene oxide adducts, and polyoxyalkylene ether polymer compounds each having a perfluoroalkyl ether group at side chain. Among them, the polyoxyalkylene ether polymer compound having a perfluoroalkyl ether group at side chain is preferable because it has low foaming property, and the fluorosurfactant represented by General Formula (I) is particularly preferable.

$$CF_3CF_2(CF_2CF_2)_m\text{---}CH_2CH_2O(CH_2CH_2O)_nH \quad \text{General Formula (1)}$$

in General Formula (1), m is preferably an integer of 0 to 10, and n is preferably an integer of 0 to 40.

Examples of the anionic fluorosurfactants includes a perfluoroalkyl sulfonic acid compound, a perfluoroalkyl carboxylic acid compound, a perfluoroalkyl phosphoric acid ester compound, and a polyoxyalkylene ether polymer compound having a perfluoroalkyl ether group at side chain.

Examples of the perfluoroalkyl sulfonic acid compound include perfluoroalkyl sulfonic acid, and a salt of perfluoroalkyl sulfonic acid.

Examples of the perfluoroalkyl carboxylic acid compound include perfluoroalkyl carboxylic acid, and a salt of perfluoroalkyl carboxylic acid.

Examples of the perfluoroalkyl phosphoric acid ester compound include perfluoroalkyl phosphoric acid ester and a salt of perfluoroalkyl phosphoric acid ester.

Examples of the polyoxyalkylene ether polymer compound having a perfluoroalkyl ether group at side chain include polyoxyalkylene ether polymer having a perfluoroalkyl ether group at side chain thereof, a sulfuric ester salt of polyoxyalkylene ether polymer having a perfluoroalkyl ether group at side chain thereof, and a salt of polyoxyalkylene ether polymer having a perfluoroalkyl ether group at side chain thereof.

Examples of a counter ion of the salt of these fluorosurfactants include Li, Na, K, $NH_4$, $NH_3CH_2CH_2OH$, $NH_2(CH_2CH_2OH)_2$, and $NH(CH_2CH_2OH)_3$.

As other examples of the fluorosurfactant, those represented by the following General Formulae (2) to (10) are preferable.

<Anionic Fluorosurfactant>

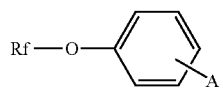

General Formula (2)

in General Formula (2), Rf denotes a mixture of a fluorine-containing hydrophobic groups represented by Structural Formula (2a); A is —$SO_3X$, —COOX, or —$PO_3X$, where X denotes a counter ion, specifically, a hydrogen atom, Li, Na, K, $NH_4$, $NH_3CH_2CH_2OH$, $NH_2(CH_2CH_2OH)_2$, or $NH(CH_2CH_2OH)_3$.

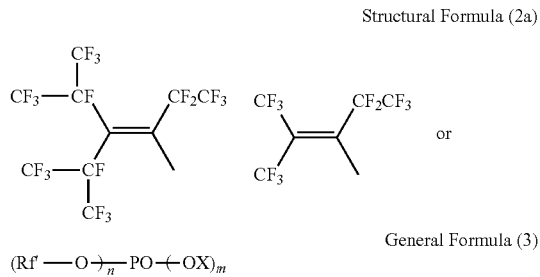

Structural Formula (2a)

(Rf'—O$\overline{\phantom{xx}})_n$—PO—(OX)$_m$     General Formula (3)

in General Formula (3), Rf' denotes a fluorin-containing group represented by Structural Formula (3a); X is the same as in General Formula (2); n denotes 1 or 2; and m denotes 2–n.

F—(CF$_2$CF$_2$)$_n$—CH$_2$CH$_2$—     Structural Formula (3a)

in Structural Formula (3a), n denotes an integer of 3 to 10.

Rf'—S—CH$_2$C$_2$—COOX     General Formula (4)

in General Formula (4), X is the same as in General Formula (2), and Rf' is the same as in General Formula (3).

Rf—SO$_3$X     General Formula (5)

in General Formula (5), X is the same as in General Formula (2), and Rf' is the same as in General Formula (3).

<Nonionic Fluorosurfactant>

Rf—O—(CH$_2$CH$_2$O)$_n$—H     General Formula (6)

in General Formula (6), Rf is the same as in General Formula (2), and n denotes an integer of 5 to 20.

Rf'—O—(CH$_2$CH$_2$O)$_n$—H     General Formula (7)

in General Formula (7), Rf' is the same as in General Formula (3), and n denotes an integer of 1 to 40.

<Amphoteric Fluorosurfactant>

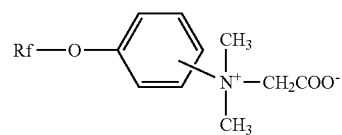

General Formula (8)

in General Formula (8), Rf is the same as in General Formula (2).

<Oligomer Fluorosurfactant>

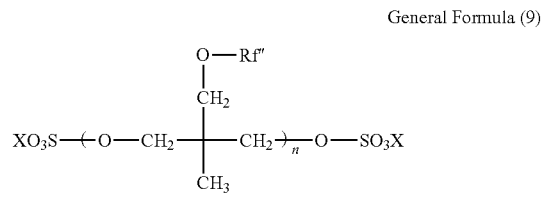

General Formula (9)

in General Formula (9), Rf' is the fluorine-containing group represented by Structural Formula (9a); n denotes an integer of 1 to 10; and X is the same as in General Formula (2).

F—(CF$_2$CF$_2$)$_n$—CH$_2$—     Structural Formula (9a)

in Structural Formula (9a), n denotes an integer of 1 to 4.

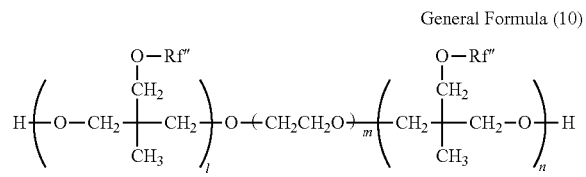

General Formula (10)

in General Formula (10), Rf' is the same as in General Formula (9); l denotes an integer of 1 to 10; m denotes an integer of 1 to 10; and n denotes an integer of 1 to 10.

As the fluorosurfactant commercially available products may be used. Examples of the commercially available products include: SURFLON S-111, S-112, S-113, S-121, S-131, S-132, S-141, S-145 (all manufactured by AGC SEIMI CHEMICAL CO., LTD); FLUORAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC Corporation); ZONYL TBS, FSP, FSA, FSN-100, FSN, FSO-100, FSO, FS-300, UR (all manufactured by E.I. du Pont de Nemours & Company); FT-110, FT-250, FT-251, FT-400S, FT-150, FT-400SW (all manufactured by NEOS COMPANY LIMITED); PolyFox PF-136A, PF-156A, PF-151N, PF-154, PF-159 (all manufactured by Omnova Solutions, Inc). Among them, FS-300 of E.I. du Pont de Nemours & Company, FT-110, FT-250, FT-251, FT-400S, FT-150, and FT-400SW of NEOS COMPANY LIMITED, and PolyFox PF-151N of Omnova Solutions, Inc. are particularly preferable because use thereof helps to obtain excellent printing quality, especially color forming properties, and significantly improves level dying to paper.

The silicone surfactant is suitably selected depending on the intended purpose without any restriction, and examples thereof include side chain-modified polydimethylsiloxane, both terminals-modified polydimethylsiloxane, one terminal-modified polydimethylsiloxane, and side chain and both terminals-modified polydimethylsiloxane. The polyether-modified silicone surfactant having a polyoxyethylene group, and a polyoxyethylene polyoxypropylene group as a modified group is particularly preferable because it has excellent properties as an aqueous surfactant.

Such silicone surfactant may be selected from those appropriately synthesized or commercially available products. The commercially available products are readily available from, for example, BYK Japan K.K., Shin-Etsu Chemical Co., Ltd., Dow Corning Toray Co., Ltd., Nihon Emulsion Co., Ltd., and Kyoeisha Chemical Co., Ltd.

The polyether-modified silicone surfactant is suitably selected depending on the intended purpose without any restriction. Examples thereof include a compound in which the polyalkylene oxide structure represented by General Formula (11) is introduced to a Si portion of a side chain of dimethylpolysiloxane.

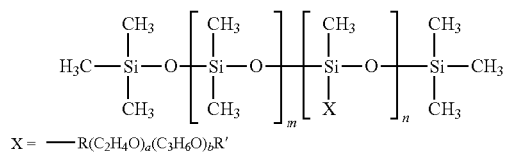

General Formula (11)

In General Formula (11), m, n, a, and b each denote an integer of 1 or more; and R and R' each denote an alkyl group or an alkylene group.

As the polyether-modified silicone surfactant, commercially available products may be used. Examples of the commercially available products of the polyether-modified silicone surfactant include: KF-618, KF-642, and KF-643 (Shin-Etsu Chemical Co., Ltd.); EMALEX-SS-5602, and SS-1906EX (Nihon Emulsion Co., Ltd.); FZ-2105, FZ-2118, FZ-2154, FZ-2161, FZ-2162, FZ-2163, and FZ-2164 (Dow Corning Toray Co., Ltd.); and BYK-33, and BYK-387 (BYK Japan K.K.).

Examples of the anionic surfactant include an acetic acid salt of polyoxyethylene alkylether, dodecylbenzene sulfonic acid salt, lauryl acid salt, and a salt of polyoxyethylene alkyl ether sulfate.

Examples of the nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkyl amide.

The amount of the surfactant contained in the pre-treatment liquid is preferably 0.001% by mass to 5% by mass, more preferably 0.05% by mass to 1% by mass. When the amount of the surfactant is less than 0.001% by mass, an obtainable effect by adding the surfactant may be small. When the amount of the surfactant is more than 5% by mass, any improvement cannot be attained in enhancing the effect of the surfactant by increasing the amount to be added.

—Other Components—

The pre-treatment liquid used in the present invention preferably contains at least one selected from the group consisting of a non-wettable C8-11 polyol compound and a glycol ether compound, as a penetrating agent. The non-wettable agent means those having a solubility of 0.2% by mass to 5.0% by mass in water of 25° C.

Among them, a 1,3-diol compound represented by General Formula (12) is preferable, with particular preference given to 2-ethyl-1,3-hexanediol having a solubility of 4.2% (25° C.), and 2,2,4-trimethyl-1,3-pentanediol having a solubility of 2.0% (25° C.).

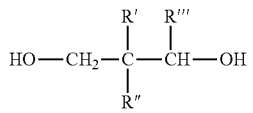

General Formula (12)

In General Formula (12), R' denotes a methyl group or ethyl group; R" denotes a hydrogen atom or methyl group; and R'" denotes an ethyl group or propyl group.

Examples of non-wettable polyol compounds other then described above include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexane-1,2-diol.

Other penetrating agents that can be used in combination with those described above are suitably selected depending on the intended purpose without any restriction, as long as they can be dissolved in the pre-treatment liquid to thereby control the pre-treatment liquid to have the desirable properties. Examples thereof include: alkyl or aryl ether of polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohol such as ethanol.

In this case, the amount of the penetrating agent contained in the pre-treatment liquid is preferably 0.1% by mass to 5.0% by mass. When the amount thereof is less than 0.1% by mass, the penetrating agent may not give the effect of making the pre-treatment liquid penetrate. When the amount thereof is more than 5.0% by mass, part of the penetrating agent is separated from the solvent as the penetrating agent has low solubility to the solvent, and therefore the effect of improving penetration of the pre-treatment liquid may be saturated.

Note that, the pre-treatment liquid used in the present invention may optionally contain an antiseptic agent, an anti-rust agent, and the like, which are used in the inkjet ink described below.

The pH value of the pre-treatment liquid is preferably 5 to 9.5. When the pH value of the e pre-treatment liquid is lower than 5, the neutralization of the water-soluble aliphatic organic acid with the water-soluble organic monoamine compound is not performed sufficiently to thereby providing insufficient effect of improving image quality. When the pH value thereof is higher than 9.5, the liberated amine may reduce image density.

<Inkjet Ink>

An inkjet ink used in the present invention contains at least an aqueous pigment dispersion in which a pigment is dispersed with an anionic dispersant or a nonionic dispersant, a water-soluble organic solvent, an anionic ionomer-based aqueous urethane resin (hereinafter, also referred to as an aqueous urethane resin α), a surfactant, a penetrating agent and water, and has characteristics of aggregating by the action of the pre-treatment liquid used in the present invention.

In the case where the aqueous pigment dispersion, particularly, the aqueous pigment dispersion in which a pigment is dispersed with a nonionic dispersant alone is used, the pigment particles therein are hardly aggregated merely by mixing the aqueous pigment dispersion with the pre-treatment liquid. However, when the ink contains the aqueous urethane resin α in combination with the aqueous pigment dispersion, and is brought into contact with the pre-treatment liquid, the aqueous urethane resin α is cut and dispersed in the ink, to thereby be aggregated. Although the reason why this phenomenon occurs is not clear, it is believed that it occurs because the aqueous urethane resin α is easily aggregated by the influence of the pre-treatment liquid. When anionic water-dispersible resins and nonionic water-dispersible resins other than described above are used, these resins are hardly aggregated or have weak aggregation properties, to thereby obtain small effect on improvement of image quality including image density and color saturation. When a cationic water-dispersible resin is used, it is difficult to keep stability of the ink.

By causing the phenomenon that when the aqueous urethane resin α is in contact with the pre-treatment liquid the aqueous urethane resin α is cut and dispersed to thereby be aggregated on a recording medium, the aqueous urethane resin α is aggregated and encapsulates the aqueous pigment dispersion therein simultaneously, and the pigment remains near a surface of the recording medium, to thereby improve image quality including image density and color saturation of the resulting images. Moreover, by using a resin capable of forming a film at low temperature, the resin forms a film at room temperature, and a pigment is fixed on the recording medium, to thereby cause less smear adhesion of the resulting images.

—Anionic Ionomer-Based Aqueous Urethane Resin (Aqueous Urethane Resin α)—

As the aqueous urethane resin α, particularly, a polyester urethane resin emulsion and a polyether urethane resin emulsion, each having about pH 7.5 to about pH 10 are preferably used. The minimum film forming temperature of the urethane resin emulsion is preferably room temperature or lower.

Examples of commercially available products of the polyester urethane resin include HYDRAN HW-140SF, HYDRAN ADS-110, HYDRAN ADS-120, HYDRAN HW-311, HYDRAN HW-333, HYDRAN HW-350, HYDRAN HW-930, HYDRAN AP-20, HYDRAN AP-40, HYDRAN AP-40N, HYDRAN APX-101H, and HYDRAN AP-60LM (manufactured by DIC Corporation). Examples of commercially available products of the polyether urethane resin include HYDRAN HW-312B, HYDRAN WLS-201, HYDRAN WLS-210, and HYDRAN WLS-213 (manufactured by DIC Corporation).

The aqueous urethane resin α causes breaking of a dispersion state thereof, or secession of molecular chains thereof such as hydrolysis under the conditions of strong alkaline or strong acidity. Thus, the pH of the aqueous urethane resin α is preferably 6 to 11, more preferably 7 to 11, even more preferably 7.5 to 10, from the standpoint of compatibility of the aqueous urethane resin α with the aqueous pigment dispersion.

The volume average particle diameter ($D_{50}$) of the aqueous urethane resin α is relevant to the viscosity of the dispersion liquid. In the case of aqueous urethane resins α having the same composition, the smaller the particle diameter becomes, the higher the viscosity is at the same solid content. The volume average particle diameter ($D_{50}$) of the water-dispersible resin is preferably 20 nm or greater to prevent the resulting ink from having excessively high viscosity. When the volume average particle diameter ($D_{50}$) is several tens micrometers, the aqueous urethane resin α cannot be used because the diameter of the aqueous urethane resin α is greater than that of nozzle holes of an inkjet head. When the volume average particle diameter ($D_{50}$) of the aqueous urethane resin α is smaller than that of nozzle holes but particles having large particle diameters are present in an ink, the ink ejection stability degrades. In order not to impair the ink ejection stability, the volume average particle diameter ($D_{50}$) of the aqueous urethane resin α is preferably 200 nm or smaller, and more preferably 150 nm or smaller.

The aqueous urethane resin α preferably has a function to fix the aqueous pigment dispersion on the surface of paper, to form a coat at normal temperature and to improve fixability of a coloring material. Therefore, the minimum film forming temperature (MFT) of the aqueous urethane resin α is preferably 30° C. or lower.

The amount of the aqueous urethane resin α contained in the inkjet ink, as a solid content, is preferably 1% by mass to 15% by mass, and more preferably 2% by mass to 10% by mass. The solid content of the inkjet ink can be determined by a method of separating only the aqueous pigment dispersion and the aqueous urethane resin α from the inkjet ink. In addition, when a pigment is used as the aqueous pigment dispersion, a mass reduction ratio of the resulting inkjet ink is evaluated through a thermal mass analysis, thereby making it possible to measure a mass ratio between the pigment and the aqueous urethane resin α. When the molecular structure of the colorant of the aqueous pigment dispersion is apparently known, it is possible to determine the solid content of the colorant using the NMR; in the case where the colorant is an inorganic pigment contained in heavy metal atoms and molecular skeleton, or a metal-containing organic pigment or metal-containing dye, the solid content of the colorant can be determined using the fluorescent X-ray analysis.

In order to improve fixability, water-dispersible resins other than the aqueous urethane resin α can be used in combination. Examples of the water-dispersible resins include a condensation synthetic resin, an addition synthetic resin, and a natural polymer compound.

Examples of the condensation synthetic resin include polyester resins, polyurethane resins, polyepoxy resins, polyamide resins, polyether resins, poly(meth)acrylic resins, acryl-silicone resins, and fluororesins.

Examples of the addition synthetic resin include polyolefin resins, polystyrene resins, polyvinyl alcohol resins, polyvinyl ester resins, polyacrylic acid resins, and unsaturated carboxylic acid resins.

Examples of the natural polymer compound include cellulose, rosin, and natural rubber.

Among them, polyurethane resin particles, acryl-silicone resin particles, and fluororesin particles are particularly preferable. Moreover, two or more the water-dispersible resins may be used in combination.

—Aqueous Pigment Dispersion—

A pigment is primarily used as a colorant of an aqueous pigment dispersion used for the inkjet ink, in view of the weatherability, and, for the purpose of controlling color tone, a dye may be contained in the inkjet ink in the range not impairing the weatherability. The pigment is suitably selected depending on the intended purpose without any restriction. For example, inorganic pigments and organic pigments for black or color inks are used. These pigments may be used alone or in combination.

As the inorganic pigment, carbon black produced by the conventional methods known in the art such as a contact method, a furnace method, and a thermal method, as well as titanium oxide, iron oxide, calcium carbonate, barium sulfate, aluminum hydroxide, barium yellow, cadmium red, and chrome yellow can be used.

Examples of the organic pigment include azo pigments (e.g., azo lake, an insoluble azo pigment, a condensed azo pigment, and a chelate azo pigment), polycyclic pigments (e.g., a phthalocyanine pigment, a perylene pigment, a perinone pigment, an anthraquinone pigment, a quinacridon pigment, a dioxazine pigment, an indigo pigment, a thioindigo pigment, an iso-indolinone pigment, and a quinophtharone pigment), dye chelate (e.g., basic dye chelate, and acid dye chelate), a nitro pigment, a nitroso pigment, and aniline black. Among them pigments, those having good compatibility to water are particularly preferably used.

Specific examples of the preferable pigment for black include: carbon black (C.I. Pigment Black 7) such as furnace black, lamp black, acetylene black, and channel black; metals such as copper, iron (C.I. Pigment Black 11); metal oxides such as titanium oxide; and organic pigments such as aniline black (C.I. Pigment Black 1).

Examples of the preferable pigment for color include: C.I. Pigment Yellow 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2 (Parmanent Red 2B(Ca)), 48:3, 48:4, 49:1, 52:2, 53:1, 57:1 (brilliant carmine 6B), 60:1, 63:1, 63:2, 64:1, 81, 83, 88, 101 (iron red), 104, 105, 106, 108 (cadmium red), 112, 114, 122 (quinacridon magenta), 123, 146, 149, 166, 168, 170, 172, 177, 178, 179, 185, 190, 193, 209, 219; C.I. Pigment Violet 1 (rhodamine lake), 3, 5:1, 16, 19, 23, 38; C.I. Pigment Blue 1, 2, 15, 15:1, 15:2, 15:3 (phthalocyanine blue), 16, 17:1, 56, 60, 63; and C.I. Pigment Green 1, 4, 7, 8, 10, 17, 18, 36.

The aqueous pigment dispersion is produced by dispersing the aforementioned pigments with an anionic dispersant or nonionic dispersant.

Examples of the anionic dispersant include polyoxyethylene alkylether acetate, an alkylbenzene sulfonic acid salt (NH$_4$, Na, Ca), an alkyldiphenylether disulfonic acid salt (NH$_4$, Na, Ca), a sodium salt of dialkylsuccinate sulfonate, a sodium salt of a naphthalene sulfonate-formalin condensate, an ester salt of a polyoxyethylene polycyclic phenylether sulfate (NH$_4$, Na), a lauric acid salt, a sulfate salt of polyoxyethylene alkylether, and an oleic acid salt. Among them, a sodium salt of dioctyl sulfosuccinate, and an ammonium salt of polyoxyethylene styrene phenylether sulfonate are particularly preferable.

As the nonionic dispersant, a nonionic dispersant having an HLB value of 10 to 20 is preferable. Examples thereof include polyoxyethylene alkylether, polyoxyalkylene alkyl ether, polyoxyethylene polycyclic phenyl ether, sorbitan fatty acid ester, polyoxyethylene sorbitan fatty acid ester, polyoxyethylene alkyl phenyl ether, polyoxyethylene alkyl amine, polyoxyethylene alkyl amide, and acetylene glycol. Among them, polyoxyethylene lauryl ether, polyoxyethylene-β-naphthylether, polyoxyethylene sorbitan monooleate, and polyoxyethylene styrene phenyl ether are particularly preferable.

The above-mentioned dispersant is dissolved in an aqueous medium. Next, the organic pigment or the inorganic pigment is added thereto, and the system is sufficiently wetted, followed by high-speed stirring through use of a homogenizer, or stirring and dispersing through use of a dispersing machine using a ball such as a bead mill and a ball mill, a dispersion kneader using a shearing force such as a roll mill, a ultrasonic wave dispersing machine, or the like, to thereby produce a pigment dispersion. In most cases, coarse particles are contained in the resulting pigment dispersion after such a kneading/dispersing step. This causes inkjet nozzle clogging and/or clogging of an ink-supply channel in an apparatus, and thus there is a need to remove particles each having a particle diameter of 1 μm or greater using a filter or a centrifugal separator.

It is preferable that the dispersant be used in an amount of 1% by mass to 100% by mass, and more preferably in an amount of 10% by mass to 50% by mass, relative to the pigment. When the amount of the dispersant is small, it is impossible to form the pigment into sufficiently fine particles. When the amount of the dispersant is excessively large, excess components of the dispersant not adsorbed on the pigment adversely affect physical properties of the resulting ink, which may cause ink bleeding, and degradation of water resistance and abrasion resistance of an image to be formed.

Further, to stabilize the pigment dispersion, a water-soluble polymer compound having a weight average molecular weight of 30,000 or lower may be used in combination.

As the water-soluble polymer compound, generally, a water-soluble styrene-acrylic resin, a water-soluble acrylic resin, water-soluble polyurethane, water-soluble polyester, water-soluble styrene-maleic acid copolymer, and water-soluble α-olefin-maleic anhydride copolymer each having a weight average molecular weight of 30,000 or lower are preferable.

Among them, a water-soluble α-olefin-maleic anhydride copolymer represented by General Formula (13) having an acid value of 100 mgKOH/g to 400 mgKOH/g, and a weight average molecular weight of 5,000 to 20,000 is particularly preferable. When the acid value is lower than 100 mgKOH/g, the solubility of the alkali solution may degrade. On the other hand, when the acid value is higher than 400 mgKOH/g, the viscosity of the pigment dispersion increases, and there is a possibility that the ink-discharge properties easily degrade and the dispersion stability of the pigment dispersion easily degrades. When the weight average molecular weight is lower than 5,000, the dispersion stability of the pigment dispersion may degrade. On the other hand, when the weight average molecular weight is higher than 20,000, the solubility of the alkali solution may degrade, and the viscosity thereof may increase.

General Formula (13)

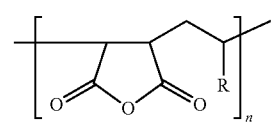

in General Formula (13), R denotes an alkyl group having 6 to 30 carbon atoms, preferably 6 to 22 carbon atoms, more preferably 18 to 22 carbon atoms, and n denotes an integer of 20 to 100, preferably an integer of 30 to 100.

In the present invention, α-olefin-maleic anhydride copolymer in which alkyl groups having different number of carbon atoms are randomly introduced into polymer chain may be used as the α-olefin-maleic anhydride copolymer represented by General Formula (13).

The weight average molecular weight of the α-olefin-maleic anhydride copolymer represented by General Formula (13) can be measured as follows.

<Measurement of Weight Average Molecular Weight>

The weight average molecular weight of a copolymer is obtained using a GPC (gel permeation chromatography) system.

First, the copolymer is dissolved in tetrahydrofuran, and KF-806L (for THF) is used as a GPC column. As a standard material for molecular weight, three polystyrenes having different molecular weights, which have been known in advance (molecular weight: 1,000, 2,400, 8,500), are measured to preliminarily form a calibration curve.

The copolymer is measured by GPC, and from a graph reflecting the resultant SEC chromatogram, the resultant differential molecular weight distribution curve, and the calibration curve obtained using the standard material for molecular weight, a weight average molecular weight of the copolymer can be calculated.

The amount used of the water-soluble polymer compound contained in the pigment dispersion is preferably 1% by mass to 100% by mass (on a solid content basis), and more preferably 5% by mass to 50% by mass, relative to the pigment. When the amount of the water-soluble polymer compound is less than 1% by mass, the effect of improving the dispersion stability may be insufficient. On the other hand, when the amount of the water-soluble polymer compound is higher than 100% by mass, the viscosity of the ink increases, the discharge stability thereof may degrade, and it may make no difference in the effect of improving the dispersion stability even when the amount thereof is increased, thereby being economically useless.

The volume average particle diameter ($D_{50}$) of the pigment particles of the pigment dispersion is preferably 150 nm or smaller, and more preferably 100 nm or smaller, in an ink. When the volume average particle diameter ($D_{50}$) of the pigment particles is greater than 150 nm, the discharge stability of the resulting ink rapidly degrades, and nozzle clogging and ink ejection deviation easily occur. On the other hand, when the volume average particle diameter ($D_{50}$) is 100 nm or smaller, the discharge stability is improved, and the color saturation of an image is also improved.

The amount of the pigment in the ink is preferably 1% by mass to 15% by mass, and more preferably 2% by mass to 12% by mass.

The polymer emulsion in which a pigment is coated with anionic polymer fine particles, and the self-dispersible pigment may be used, other than the aqueous pigment dispersion.

Examples of the polymer emulsion in which a pigment is coated with anionic polymer fine particles include those having a pigment encapsulated in each anionic polymer particle, and those having a pigment adsorbed on a surface of each polymer particle. In this case, it is not necessary that all of the particles of the pigment be encapsulated or adsorbed, and some particles of the pigment may be dispersed in the emulsion, unless they adversely affect the obtainable effect of the present invention.

Examples of the polymer for forming the anionic polymer emulsion (i.e. the polymer of the polymer particles) include vinyl-based polymer, polyester-based polymer, and polyurethane-based polymer. The vinyl-based polymer, and the polyester-based polymer are particularly preferably used, and anionic polymers disclosed in JP-A Nos. 2000-53897, and 2001-139849 can be used.

The self-dispersible pigment is a pigment each surface of particles of which is modified by bonding at least one hydrophilic group directly or via other atomic group to the surface thereof. As a method for this surface modification, a method in which a predetermined functional group (a functional group such as a sulfo group, a carboxyl group, and the like) is chemically bonded to the surface of each particle of the pigment, or a wet oxidation process using hypohalous acid or a salt thereof is used. Among these methods, a method in which a carboxyl group is bonded to a surface of each particle of a pigment, and the pigment is then dispersed in water is particularly preferable. By bonding the carboxyl group to a modified surface of each particle of the pigment, dispersion stability of the pigment improves, high quality images can be provided by the resulting ink, and water resistance of a recording medium after recording improves.

As the self-dispersible pigment, an ionic self-dispersible pigment, for example, carbon black is preferable, with particularly preference given to an anionically charged-self-dispersible carbon black having an anionic hydrophilic group.

Examples of the anionic hydrophilic group include —COOM, —$SO_3$M, —$PO_3$HM, —$PO_3M_2$, —$SO_2NH_2$, and —$SO_2$NHCOR, where M is alkali metal, ammonium or organic ammonium; and R is a C1-C12 alkyl group, a substituted or unsubstituted phenyl group, or a substituted or unsubstituted naphthyl group. Among them, —COOM, and —$SO_3$M are preferable. In the case where "M" in the aforementioned functional group is alkali metal, examples of such alkali metal include lithium, sodium, and potassium. In the case where "M" in the aforementioned functional group is organic ammonium, examples of such organic ammonium include mono-, di-, or trimethyl ammonium, mono-, di-, or triethyl ammonium, and mono-, di-, or trimethanol ammonium.

In this case, for attaining a color pigment having an anionic functional group, the anionic functional group (e.g. —COONa) can be introduced to a surface of each particle of the color pigment, for example, by a method in which a color pigment is subjected to oxidation treatment with sodium hypochlorite, a method by sulfonation, or a method to react with diazonium salt.

The hydrophilic group may be bonded to the surface of the carbon black via other atomic groups. Examples of such atomic group include a C1-C12 alkyl group, a substituted or unsubstituted phenyl group, and a substituted or unsubstituted naphthyl group. Specific examples of the substituent group bonded to the surface of the carbon black via the atomic group include —$C_2H_4$COOM (M is alkali metal or quaternary ammonium), and -$PhSO_3$M (Ph is a phenyl group, and M is alkali metal or quaternary ammonium).

—Water-Soluble Organic Solvent—

As a water-soluble organic solvent contained in the ink used in the present invention, the water-soluble organic solvent for the pre-treatment liquid is suitably used. A mass ratio of the aqueous pigment dispersion to the water-soluble organic solvent in the ink affects ejection stability of the ink jetted from a head. For example, when a small amount of the water-soluble solvent is formulated into the ink even though the solid content of the aqueous pigment dispersion is high, moisture is encouraged to evaporate adjacent to an ink meniscus of a nozzle, which may cause ejection failures.

An amount of the water-soluble organic solvent contained in the ink is preferably 20% by mass to 50% by mass, more preferably 20% by mass to 45% by mass. When the amount thereof is less than 20% by mass, ejection stability of the resulting ink may be low, or waste ink may be deposited and solidified in a retainer of an inkjet recording device. When the amount thereof is more than 50% by mass, drying properties of the ink may be low on paper, and moreover quality of a character on plain paper may be low.

—Surfactant—

As a surfactant contained in the ink used in the present invention, the surfactant used in the pre-treatment liquid is suitably used. Among the surfactants mentioned in the description of the pre-treatment liquid, those having low surface tension, high penetrating ability, and high leveling ability without adversely affecting dispersion stability depending on types of colorants or in combination with the water-soluble organic solvent for use are preferably used. Specifically, at least one selected from the group consisting of an anionic surfactant, a nonionic surfactant, a silicone surfactant, and a fluorosurfactant is suitably used. Among them, the silicone surfactant and the fluorosurfactant are particularly preferable.

An amount of the surfactant contained in the ink is preferably 0.01% by mass to 3% by mass, more preferably 0.5% by mass to 2% by mass. When the amount thereof is less than 0.01% by mass, an obtainable effect by adding the surfactant may not be sufficient. When the amount thereof is more than 3% by mass, penetrating ability of the ink to a recording medium is excessively high, which may lower density of an image to be recorded, or cause strikethrough.

—Penetrating Agent—

As a penetrating agent contained in the ink used in the present invention, the penetrating agent used for the pre-treatment liquid is suitably used. An amount of the penetrating agent contained in the ink is preferably 0.1% by mass to 4% by mass. When the amount of the penetrating agent is less than 0.1% by mass, the quick drying properties of the ink reduces, and thus bleeding may occur. When the amount of the penetrating agent is more than 4% by mass, the ink may lose the dispersion stability of the colorant, which tends to cause clogging of a nozzle of a recording device, or penetrating ability of the ink to a recording medium is excessively high, which may lower the image density, or cause strikethrough.

—Other Components—

Other components which can be added to the ink used in the present invention will be explained next. Other components are suitably selected depending on the intended purpose without any restriction, and examples thereof include a pH adjuster, an antiseptic and antifungal agent, a chelating reagent, an anti-rust agent, an antioxidant, an ultraviolet absorber, an oxygen absorbent, and a photostabilizer.

—pH Adjuster—

The pH adjuster is suitably selected depending on the intended purpose without any restriction, provided that it does not adversely affect the resulting ink and it can adjust a pH value of the resulting ink to the range of 7 to 11. Examples of the pH adjuster suitably used for the present invention include alcohol amines, alkali metal hydroxides, ammonium hydroxides, phosphonium hydroxides, and alkali metal carbonates. When the pH value of the ink is lower than 7, or higher than 11, the ink may dissolve an inkjet head or ink-supplying unit of a recording device to thereby change the properties of the ink or to cause leakages of the ink, which may cause problems such as ejection failures.

Examples of alcohol amines include diethanol amine, triethanol amine, 2-amino-2-ethyl-1,3-propanediol.

Examples of alkali metal hydroxides include lithium hydroxide, sodium hydroxide, and potassium hydroxide.

Examples of ammonium hydroxides include ammonium hydroxide, quaternary ammonium hydroxide, and quaternary phosphonium hydroxide. Examples of phosphonium hydroxide include quaternary phosphonium hydroxide.

Examples of alkali metal carbonates include lithium carbonate, sodium carbonate, and potassium carbonate.

As the antiseptic and antifungal agent, for example, sodium dehydroacetate, sodium sorbate, sodium-2-pyridinethiol-1-oxide, sodium benzoate, sodium pentachlorophenol, and the like are suitably used.

As the chelating reagent, for example, sodium ethylenediaminetetraacetate, sodium nitrilotriacetate, sodium hydroxyethylethylenediaminetriacetate, sodium diethylenetriaminepentaacetate, sodium uramildiacetate, and the like are suitably used.

As the anti-rust agent, for example, acidic sulfite salt, sodium thiosulfate, ammonium thiodiglycolate, diisopropyl ammonium nitrite, pentaerythritol tetranitrate, dicyclohexyl ammonium nitrite, and the like are suitably used.

As the antioxidant, for example, a phenol-based antioxidant (including a hindered phenol-based antioxidant), an amine-based antioxidant, a sulfur-based antioxidant, a phosphorous-based antioxidant, and the like are suitably used.

As the ultraviolet absorber, for example, a benzophenone-based ultraviolet absorber, a benzotriazol-based ultraviolet absorber, a salicylate-based ultraviolet absorber, a cyano acrylate-based ultraviolet absorber, a nickel complex salt-based ultraviolet absorber, and the like are suitably used.

—Method for Producing Ink—

The ink used in the present invention can be produced in the following manner: First, the pigment, the anionic dispersant or nonionic dispersant and water are dispersed by a bead mill, ball mill, or the like; and then the water-soluble organic solvent, the anionic ionomer-based aqueous urethane resin, the surfactant, the penetrating agent, and water, and optionally other components are dispersed or dissolved the water-dispersible coloring agent, the water-soluble organic solvent, the surfactant, the penetrating agent, and water, and optionally other components in an aqueous medium, and optionally stirring and mixing the same. The stirring and mixing can be performed, for example, by a sand mill, a homogenizer, a ball mill, a paint shaker, a ultrasonic disperser, or the like, and it is also carried out by an agitator using an agitating blade, a magnetic stirrer, or the like.

—Physical Properties of Ink—

The physical properties of the ink used in the present invention are suitably selected depending on the intended purpose without any restriction. For example, the viscosity, surface tension, and the like of the ink are preferably within the following ranges.

The viscosity of the ink is preferably 5 mPa·s to 20 mPa·s at 25° C. By adjusting the viscosity of the ink to 5 mPa·s or more, density and quality of an image to be formed can be improved. By adjusting the viscosity of the ink to 20 mPa·s or less, moreover, the ink can attain excellent ejection stability. Here, the viscosity of the ink can be measured at 25° C. by means of a viscometer (e.g. RE-550L, manufactured by TOKI SANGYO CO., LTD.).

The static surface tension of the ink used in the present invention is preferably 20 mN/m to 35 mN/m, more preferably 20 mN/m to 30 mN/m at 25° C. When the static surface tension of the ink is in the range of 20 mN/m to 35 mN/m, penetration ability of the ink increases, and the ink has excellent drying properties even when it is used for printing on plain paper, and hence occurrences of color bleeding reduce. Moreover, the ink of such surface tension easily wets the deposition part of the pre-treatment liquid on a recording medium, to thereby improve color forming properties as well as preventing occurrences of white spots. When the static surface tension thereof is higher than 35 mN/m, it is difficult to level the ink (i.e. to immediately uniformly wet a surface of a recording medium with the ink) on a recording medium, and hence drying speed may be prolonged.

A color of the ink is suitably selected depending on the intended purpose without any restriction. Examples thereof include yellow, magenta, cyan, and black. Use of an inkset appropriately containing two or more inks of these colors realizes forming of multicolor images, and use of an inkset containing inks of all colors realizes forming of full-color images.

<Image Forming Method>

An image forming method according to the present invention includes a pre-treatment step of applying a pre-treatment liquid to a recording medium, an ink-jetting step of applying a stimulus to an inkjet ink to jet the inkjet ink onto the recording medium, onto which the pre-treatment liquid has been applied, so as to form an image on the recording medium.

—Pre-Treatment Step—

The pre-treatment step is suitably selected without any restriction, provided that the step is performed in accordance with a method which can uniformly apply and deposit the per-treatment liquid on a surface of a recording medium. Examples of such method include blade coating, gravure coating, gravure off-set coating, bar coating, roller coating, knife coating, air knife coating, comma roller coating, U-comma roller coating, AKKU coating, smoothing coating, micro gravure coating, reverse roller coating, 4- or 5-roll coating, dip coating, curtain coating, slide coating, and die coating.

The pre-treatment may be carried out on a recording medium whose surface is sufficiently dry or on a recording medium whose surface is being dried, since the effect of the pre-treatment can be exhibited. Note that the recording medium that has been subjected to the pre-treatment may be dried if necessary. In this case, the recording medium may be dried by a roll heater, drum heater, or hot air.

In the pre-treatment step, an adhesion amount of the pre-treatment liquid to the recording medium is 0.1 g/m$^2$ to 30.0 g/m$^2$, more preferably 0.2 g/m$^2$ to 10.0 g/m$^2$ on wet basis (i.e. the adhesion amount of the pre-treatment liquid on the recording medium before being dried). When the adhesion amount thereof is less than 0.1 g/m$^2$ on wet basis, qualities (e.g. density, saturation, resistance to beading, and resistance to color bleeding) of an image of the formed matter may remain the same to the level of the formed matter obtained by the conventional methods. When the adhesion amount thereof is more than 30.0 g/m$^2$, the drying properties of the pre-treatment liquid degrades, or curling of the formed matter may be caused.

—Ink-Jetting Step—

The ink jetting step in the image forming method of the present invention is applying a stimulus (energy) to an ink to jet the ink onto the recording medium, onto which the pre-treatment liquid has been applied, so as to form an image on the recording medium. As the method for applying stimulus (energy) to an ink so as to form an image on a recording medium various inkjet recording methods known in the art can be used. Examples of such inkjet recording method include an inkjet recording method of head-scanning system, and an inkjet recording method in which an image is recorded on a certain sheet-shaped recording medium using aligned heads.

In the ink jetting step, the driving system of a recording head, which is a unit for jetting the ink, is not particularly restricted. Examples of the driving system include: a system using a piezoelectric element actuator using lead zirconate titanate (PZT); a system for functioning thermal energy; a system for using an on-demand head utilizing actuator or the like using electrostatic force; and a system in which a charge-controlling continuous jetting head is used for recording.

<Apparatus>

An apparatus for carrying out an image forming method of the present invention will be described with reference to FIG. 1. FIG. 1 is a schematic structural diagram showing an example of an image forming apparatus, which is configured to scan a surface of a recording medium with an inkjet recording head to form an image. In a pre-treatment liquid applying and inkjet recording apparatus shown in FIG. 1, a recording medium 6 is fed by a paper feeding roller 7, and then to this recording medium 6 a pre-treatment liquid 1 is uniformly and thinly applied by means of an application roller 4 and a counter roller 5. The pre-treatment liquid 1 is scooped up by a scoop roller 3, and uniformly applied to the surface of the application roller 4 by means of a film thickness control roller 2. The recording medium 6 to which the pre-treatment liquid 1 has been applied is conveyed to a record scanning section where an inkjet recording head 20 is located. The length of a paper-conveying path from the end point for the operation of the application of the pre-treatment liquid (A section in FIG. 1) to the starting point of the record scanning section (B section in FIG. 1) is designed to be longer than the length of the recording medium 6 in the paper feeding direction, and thus by the time the recording medium 6 reaches the starting point of the record scanning section, application of the pre-treatment liquid 1 can be completely finished. In this case, since application of the pre-treatment liquid 1 can be implemented before the inkjet recording head 20 starts scanning for printing and the recording medium 6 is intermittently conveyed, the pre-treatment liquid 1 can be continuously applied with uniformity onto the recording medium 6 at a constant conveyance speed of the recording medium 6. Note that the exemplary apparatus shown in FIG. 1 is designed so that the recording medium 6 requiring pre-treatment is supplied from the lower paper cassette and a recording medium 17 which is unnecessary to be treated or should not be treated is supplied from the upper paper cassette, thus, it is convenient to provide a long paper-conveying path for conveying recording media.

Figure 2:
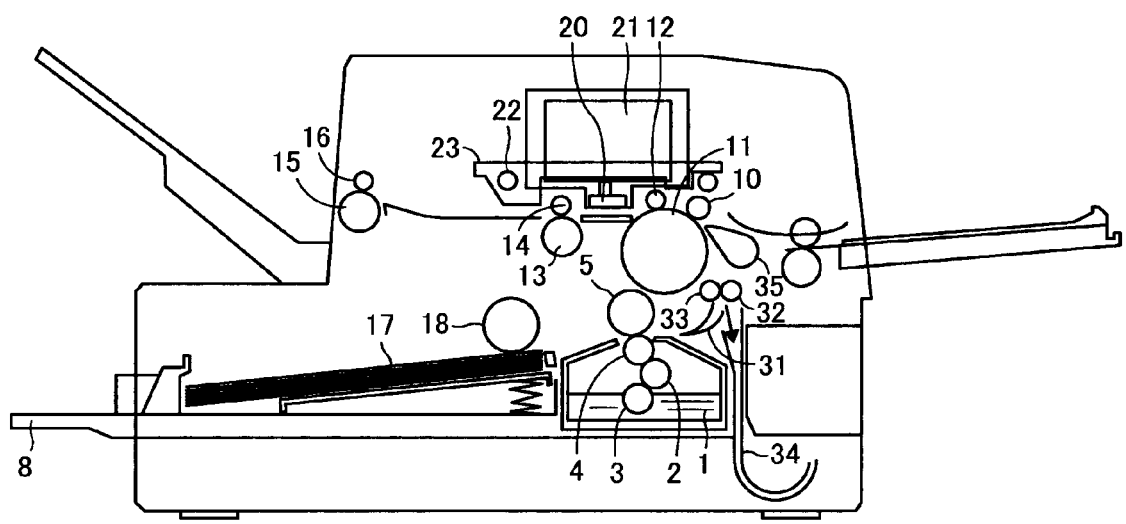
FIG. 2 is a schematic construction diagram showing another example of an inkjet recording apparatus.

In FIG. 2, "8" indicates a paper feeding tray, "10" indicates a recording medium holding roller, "11" to "16" each indicate a recording medium conveying roller, "18" indicates a feeding roller, "21" indicates an ink cartridge, "22" indicates a carriage shaft, and "23" indicates a carriage.

FIG. 2 shows another example of the apparatus for carrying out the image forming method of the present invention. The apparatus shown in FIG. 2 is also a type of a recording apparatus, which is configured to scan a surface of a recording medium with an inkjet recording head to form an image, but is an example of the recording apparatus having the structure more compact than that of the apparatus of FIG. 1.

A recording medium 17 is fed by a paper feeding roller 18, and to this recording medium 17 a pre-treatment liquid 1 is uniformly and thinly applied by means of an application roller 4 and a counter roller 5. The pre-treatment liquid 1 is scooped up by a scoop roller 3, and uniformly applied to the surface of the application roller 4 by means of a film thickness control roller 2. With being applied with the pre-treatment liquid 1, the recording medium 17 passes a record scanning section where an inkjet recording head 20 is located, and is conveyed until application of the pre-treatment liquid 1 on the recoating medium 17 is completed. At the point where application of the pre-treatment liquid 1 to the recording medium 17 is completed, the recording medium 17 is again returned to the record scanning section until the front end of the recording medium 17 reaches the starting point of the record scanning section. Whether or not application of the pre-treatment liquid is completed can be detected by providing a known recording-medium detection unit (not shown) near the outlet of a pre-treatment liquid application unit of the recording device. This detection unit is not necessarily provided, and the apparatus may have a system configuration where information of the length of the recording medium 17 is previously input in a controller, and the feed per revolution of the outer periphery of a recording medium conveying roller corresponds to the length of the recording medium 17 by controlling the number of revolutions of a motor.

The recording medium 17 to which the pre-treatment liquid 1 has been applied is conveyed again to the record scanning section before the pre-treatment liquid 1 is dried and solidified. At this time, the recording medium 17 is intermittently conveyed again to the record scanning section so as to meet the timing with the scanning operation of the inkjet recording head 20. When the recording medium 17 is returned to the same path through which it is first conveyed, the rear end of the recording medium 17 is reversely entered into the pre-treatment liquid application unit, possibly causing defects such as nonuniform coating and jam of a recording medium. Therefore, when the recording medium 17 is returned backward, the direction thereof is switched by a recording medium guide 31. That is, when the recording medium 17 is conveyed backward after being coated with the pre-treatment liquid 1, the recording medium guide 31 is moved by a known unit such as a solenoid and a motor to the position indicated with a dotted line in the figure. With this configuration, the recording medium 17 is conveyed to the position where a recording medium return guide 34, and thus it is possible to prevent smear of recording medium 17 and paper jam.

In FIG. 3, "8" indicates a paper feeding tray, "10" indicates a recording medium holding roller, "11" to "16" each indicate a recording medium conveying roller, "21" indicates an ink cartridge, "22" indicates a carriage shaft, "23" indicates a carriage, "32" and "33" each indicate a recording medium conveying roller and "35" indicates a conveying path switch guide.

The pre-treatment step is preferably continuously performed at a constant linear speed of 10 mm/s to 1,000 mm/s. In order to perform this step at such speed, in the aforementioned examples of the recording apparatus, a recording medium in the form of a sheet is used, and an operation of applying an ink to a certain recording medium by the inkjet recording method, so as to form an image is started after an operation of applying the pre-treatment liquid to such recording medium is completed. In such recording apparatus, the speed of applying the pre-treatment liquid and the speed of recording an image are not matched in most of cases, there is a difference in time from when the pre-treatment liquid is applied to when an image is recorded between the recording starting point of a certain sheet and the recording end point of the sheet. Even if this difference is significant, it is possible to substantially prevent evaporation of water from the pre-treatment liquid, as the pre-treatment liquid contains a large amount of a hydrophilic solvent having a boiling point higher than that of water and slow evaporation speed, and having an adjusted water ratio close to an equilibrium water content in the air under an environment where a printer is used. Therefore, the difference in image quality caused between the recording start portion and the recording end portion of the sheet of the recording medium can be lowered to at least the level or lower where such a difference can be visually observed.

As is evident from the conveying process of a recording medium in this apparatus, in most cases, a recording medium is necessary to be conveyed with members in contact with the recording medium coated with a pre-treatment liquid, such as rollers, roller bearings, and guides, after application of the pre-treatment liquid onto the recording medium. In this case, if the pre-treatment liquid applied to a recording medium is transferred to conveying members of the recording medium, conveying functions may be damaged, and smear may accumulate thereon, causing degradation of image quality. The occurrence of such problem can be prevented by using members, for example, a guide of a wave-shaped plate, a spur-shaped roller bearing, and a roller whose surface is made of a water-repellent material.

However, it is desirable that the pre-treatment liquid applied to a recording medium be quickly absorbed into the recording medium and the surface of recording medium appears dry. To achieve this object, it is effective to adjust the surface tension of the pre-treatment liquid to 30 mN/m or lower, so that the liquid is quickly absorbed into the recording medium. The "drying and solidifying" of the pre-treatment liquid that has been applied to a recording medium does not mean that the pre-treatment liquid is absorbed into the recording medium and the surface of the recording medium appears dry as described above, but means that liquid compounds in the pre-treatment liquid, such as water, evaporates and cannot maintain a liquid state, followed by solidifying.

Even if the pre-treatment liquid of the present invention is absorbed into a recording medium and the surface thereof appears dry by using the pre-treatment liquid in a recording apparatus including a combination of an inkjet treatment liquid application unit and an image recording apparatus as described above, inkjet recording can be performed with a state where the pre-treatment liquid is not actually solidified, and the image quality can be remarkably improved with an extremely small amount of the pre-treatment liquid to be applied.

EXAMPLES

Examples of the present invention will be specifically described with Examples and Comparative Examples hereinafter, but these examples shall not be construed as limiting to the scope of the present invention in any way. In the following examples, "part(s)" and "%" respectively means "part(s) by mass" and "% by mass".

Preparation Example 1

Preparation of Water-Soluble Polymer Compound Aqueous Solution A

The material having the following formulation was heated and stirred with a stirrer, so as to dissolve α-olefin-maleic anhydride copolymer represented by General Formula (13) in the solution. Then, a small amount of insoluble matter is filtered with a filter having an average pore diameter of 5 μm, to thereby prepare Water-Soluble Polymer Compound Aqueous Solution A.

<Formulation>

| | |
|---|---|
| α-olefin-maleic anhydride copolymer represented by General Formula (13) (T-YP112, manufactured by SEIKO PMC CORPORATION, R: an olefin chain having 20 to 24 carbon atoms, (α-olefin-maleic anhydride copolymer, where R in General Formula (13) corresponds to an alkyl group having 18 to 22 carbon atoms), acid value: 190 mgKOH/g, and weight average molecular weight: 10,000) | 10.0 parts |
| 1N—LiOH aqueous solution (1.2 times in acid value of that of α-olefin-maleic anhydride copolymer represented by General Formula (13)) | 17.34 parts |
| ion exchanged water | 72.66 parts |

Preparation Example 2

Preparation of Yellow Pigment-Surfactant Dispersion Liquid

| | |
|---|---|
| monoazo yellow pigment (C.I. Pigment Yellow 74, manufactured by Dainichiseika Color & Chemicals Mfg. Co., Ltd.) | 20.0 parts |
| polyoxyethylene styrene phenyl ether (a nonionic surfactant, manufactured by DAI-ICHI KOGYO SEIYAKU CO., LTD., NOIGEN EA-177, HLB value: 15.7) | 7.0 parts |
| ion exchanged water | 73.0 parts |

First, the surfactant listed above was dissolved in ion exchanged water, the pigment listed above was mixed therewith, and then sufficiently wetted. Then, the system was dispersed at 2,000 rpm for 2 hours using a wet-process dispersing machine (DYNO-MILL KDL A Model, manufactured by WAB AG) which was filled with zirconia beads having a diameter of 0.5 mm, to obtain a primary pigment dispersion.

Next, to the primary pigment dispersion, 2.84 parts of a water-soluble polyurethane resin (TAKELAC W-5661, manufactured by Mitsui Chemicals, Inc., a component: 35.2%, acid value: 40 mgKOH/g, molecular weight: 18,000) were added as a water-soluble polymer compound aqueous solution, and sufficiently stirred to thereby obtain a yellow pigment-surfactant dispersion liquid.

An average particle diameter ($D_{50}$) of the pigment dispersion in the resulting yellow pigment-surfactant dispersion liquid was 62 nm as measured with a particle size distribution measurement device (NANOTRACK UPA-EX150, manufactured by NIKKISO Co., Ltd.).

Preparation Example 3

Preparation of Magenta Pigment-Surfactant Dispersion Liquid

| | |
|---|---|
| quinacridone pigment (C.I. Pigment Red 122, manufactured by Dainichiseika Color & Chemicals Mfg. Co., Ltd.) | 20.0 parts |
| polyoxyethylene-β-naphthylether (nonionic surfactant, RT-100, manufactured by TAKEMOTO OIL & FAT Co., Ltd. HLB value = 18.5) | 7.0 parts |
| ion exchanged water | 73.0 parts |

First, the surfactant listed above was dissolved in ion exchanged water, the pigment listed above was mixed therewith, and then sufficiently wetted. Then, the system was dispersed at 2,000 rpm for 2 hours using a wet-process dispersing machine (DYNO-MILL KDL A Model, manufactured by WAB AG) which was filled with zirconia beads having a diameter of 0.5 mm, to obtain a primary pigment dispersion.

Next, to the primary pigment dispersion, 4.76 parts of a water-soluble styrene-(meth)acrylic acid copolymer (JC-05, manufactured by SEIKO PMC CORPORATION, a component: 21%, acid value: 170 mgKOH/g, weight average molecular weight: 16,000) were added, and sufficiently stirred to thereby obtain a magenta pigment-surfactant dispersion liquid.

An average particle diameter ($D_{50}$) of the pigment dispersion in the resulting magenta pigment-surfactant dispersion liquid was measured in the same manner as in Preparation Example 2 and found to be 83 nm.

Preparation Example 4

Preparation of Cyan Pigment-Surfactant Dispersion Liquid (1)

| | |
|---|---|
| phthalocyanine pigment (C.I. Pigment Blue 15:3, manufactured by Dainichiseika Color & Chemicals Mfg. Co., Ltd.) | 20.0 parts |
| polyoxyethylene styrene phenyl ether (a nonionic surfactant, manufactured by DAI-ICHI KOGYO SEIYAKU CO., LTD., NOIGEN EA-177, HLB value: 15.7) | 7.0 parts |
| ion exchanged water | 73.0 parts |

First, the surfactant listed above was dissolved in ion exchanged water, the pigment listed above was mixed therewith, and then sufficiently wetted. Then, the system was dispersed at 2,000 rpm for 2 hours using a wet-process dispersing machine (DYNO-MILL KDL A Model, manufactured by WAB AG) which was filled with zirconia beads having a diameter of 0.5 mm, to obtain a primary pigment dispersion.

Next, to the primary pigment dispersion, 15.0 parts of the water-soluble polymer compound aqueous solution A of Preparation Example 1 were added, and sufficiently stirred to thereby obtain a cyan pigment-surfactant dispersion liquid (1).

An average particle diameter ($D_{50}$) of the pigment dispersion in the resulting cyan pigment-surfactant dispersion liquid was measured in the same manner as in Preparation Example 2 and found to be 78 nm.

Preparation Example 5

Preparation of Cyan Pigment-Surfactant Dispersion Liquid (2)

| | |
|---|---|
| phthalocyanine pigment (C.I. Pigment Blue 15:3, manufactured by Dainichiseika Color & Chemicals Mfg. Co., Ltd.) | 20.0 parts |
| polyoxyethylene styrene phenyl ether ammonium sulfonate (an anionic surfactant, manufactured by DAI-ICHI KOGYO SEIYAKU CO., LTD., HITENOL NF-17) | 7.0 parts |
| ion exchanged water | 73.0 parts |

First, the surfactant listed above was dissolved in ion exchanged water, the pigment listed above was mixed therewith, and then sufficiently wetted. Then, the system was dispersed at 2,000 rpm for 2 hours using a wet-process dispersing machine (DYNO-MILL KDL A Model, manufactured by WAB AG) which was filled with zirconia beads having a diameter of 0.5 mm, to obtain a primary pigment dispersion.

Next, to the primary pigment dispersion, 3.35 parts of a water-soluble polyester resin (Nichigo POLYESTER W-0030, manufactured by The Nippon Synthetic Chemical Industry Co., Ltd., a component: 29.9%, acid value: 100 mgKOH/g, weight average molecular weight: 7,000) was added, and sufficiently stirred to thereby obtain a cyan pigment-surfactant dispersion liquid (2).

An average particle diameter ($D_{50}$) of the pigment dispersion in the resulting cyan pigment-surfactant dispersion liquid was measured in the same manner as in Preparation Example 2 and found to be 88 nm.

Preparation Example 6

Preparation of Cyan Pigment-Surfactant Dispersion Liquid (3)

| | |
|---|---|
| phthalocyanine pigment (C.I. Pigment Blue 15:3, manufactured by Dainichiseika Color & Chemicals Mfg. Co., Ltd.) | 20.0 parts |
| lauryl dimethyl benzyl ammonium bromide (a cationic surfactant, CATINAL CB-50, manufactured by TOHO Chemical Industry Co., LTD.) | 7.0 parts |
| ion exchanged water | 73.0 parts |

First, the surfactant listed above was dissolved in ion exchanged water, the pigment listed above was mixed therewith, and then sufficiently wetted. Then, the system was dispersed at 2,000 rpm for 2 hours using a wet-process dispersing machine (DYNO-MILL KDL A Model, manufactured by WAB AG) which was filled with zirconia beads having a diameter of 0.5 mm, to obtain a primary pigment dispersion.

Next, to the primary pigment dispersion, 3.35 parts of a water-soluble polyester resin (Nichigo POLYESTER W-0030, manufactured by The Nippon Synthetic Chemical Industry Co., Ltd., a component: 29.9%, acid value: 100 mgKOH/g, weight average molecular weight: 7,000) was added, and sufficiently stirred to thereby obtain a cyan pigment-surfactant dispersion liquid (3).

However, after a while, the dispersion liquid was started to be aggregated and thickened, and the volume average particle diameter ($D_{50}$) of the pigment dispersion could not be measured. An ink could not be produced.

Production Examples 1 to 16

Production of Inks 1 to 16

Each inkjet ink was produced according to the following procedure. First, a water-soluble organic solvent (wetting agent), a penetrating agent, a surfactant, an antifungal agent and water shown in Table 1 were mixed and stirred for 1 hour so as to be uniformly mixed. In addition, depending on the mixture liquid, a water-dispersible resin was added, and stirred for 1 hour, followed by adding the pigment dispersion liquid, an anti-foaming agent and a pH adjustor to the mixture liquid and stirring for 1 hour. This dispersion liquid was filtered under pressure through a polyvinylidene fluoride-membrane filter having an average pore diameter of 5.0 μm to remove coarse particles and foreign particles therefrom, to thereby produce each of inks of Production Examples 1 to 16.

TABLE 1

| | Component (%) | Production Example | | | | | | | |
|---|---|---|---|---|---|---|---|---|---|
| | | 1 | 2 | 3 | 4 | 5 | 6 | 7 | 8 |
| Pigment dispersion liquid | yellow pigment surfactant dispersion liquid (Production Example 2) | 22.50 | — | — | — | 22.50 | — | — | — |
| | magenta pigment surfactant dispersion liquid (Production Example 3) | — | 37.50 | — | — | — | 37.50 | — | — |
| | cyan pigment surfactant dispersion liquid (1) (Production Example 4) | — | — | 22.50 | — | — | — | 22.50 | — |
| | cyan pigment surfactant dispersion liquid (2) (Production Example 5) | — | — | — | — | — | — | — | — |
| | self-dispersible black pigment dispersion liquid (CAB-O-JET 300) | — | — | — | 53.30 | — | — | — | 53.30 |
| Water-dispersible resin | anionic ionomer-based aqueous urethane resin 1 | — | — | — | — | 10.00 | — | — | — |
| | anionic ionomer-based aqueous urethane resin 2 | — | — | — | — | — | 8.60 | — | — |
| | anionic ionomer-based aqueous urethane resin 3 | — | — | — | — | — | — | 10.00 | 6.67 |
| | acrylic-silicone resin emulsion | — | — | — | — | — | — | — | — |
| Wetting agent | 1,3-butanediol | 26.00 | 24.00 | 26.00 | — | 18.00 | 17.00 | 18.00 | — |
| | 3-methyl-1,3-butanediol | — | — | — | 16.00 | — | — | — | 15.00 |
| | 2-pyrrolidone | — | — | — | 2.00 | — | — | — | 2.00 |
| | glycerin | 13.00 | 12.00 | 13.00 | 16.00 | 18.00 | 17.00 | 18.00 | 15.00 |
| Penetrating agent | 2-ethyl-1,3-hexanediol | 1.00 | 1.00 | 1.00 | 1.00 | 2.00 | 2.00 | 2.00 | 2.00 |
| | 2,2,4-trimethyl-1,3-pentanediol | 1.00 | 1.00 | 1.00 | 1.00 | — | — | — | — |
| Surfactant | ZONYL FS-300 | 2.50 | 2.50 | 2.50 | 2.50 | 2.50 | 2.50 | 2.50 | 2.50 |
| | KF-634 | 1.00 | 1.00 | 1.00 | 1.00 | — | — | — | — |
| | SOFTANOL EP-7025 | — | — | — | — | — | — | — | — |
| Antifungal Agent | PROXEL GXL | 0.05 | 0.05 | 0.05 | 0.05 | 0.05 | 0.05 | 0.05 | 0.05 |
| Antifoaming agent | Silicone antifoaming agent KM-72F | 0.10 | 0.10 | 0.10 | 0.10 | 0.10 | 0.10 | 0.10 | 0.10 |
| pH adjuster | 2-amino-2-ethyl-1,3-propanediol | 0.20 | 0.30 | 0.30 | 0.40 | 0.30 | 0.30 | 0.30 | 0.40 |
| | Pure water | balance | balance | balance | balance | balance | balance | balance | balance |
| | Total (%) | 100 | 100 | 100 | 100 | 100 | 100 | 100 | 100 |

TABLE 2

| | Component (%) | Production Example 9 | 10 | 11 | 12 | 13 | 14 | 15 | 16 |
|---|---|---|---|---|---|---|---|---|---|
| Pigment dispersion liquid | yellow pigment surfactant dispersion liquid (Production Example 2) | 22.50 | — | — | — | 22.50 | — | — | — |
| | magenta pigment surfactant dispersion liquid (Production Example 3) | — | 37.50 | — | — | — | 37.50 | — | — |
| | cyan pigment surfactant dispersion liquid (1) (Production Example 4) | — | — | — | — | — | — | 22.50 | — |
| | cyan pigment surfactant dispersion liquid (2) (Production Example 5) | — | — | 22.50 | — | — | — | — | — |
| | self-dispersible black pigment dispersion liquid (CAB-O-JET 300) | — | — | — | 53.50 | — | — | — | 53.50 |
| Water-dispersible resin | anionic ionomer-based aqueous urethane resin 1 | 10.00 | — | — | — | — | — | — | — |
| | anionic ionomer-based aqueous urethane resin 2 | — | 8.60 | — | — | — | — | — | — |
| | anionic ionomer-based aqueous urethane resin 3 | — | — | 10.00 | 6.67 | — | — | — | — |
| | acrylic-silicone resin emulsion | — | — | — | — | 11.25 | 7.50 | 11.25 | 7.50 |
| Wetting agent | 1,3-butanediol | 18.00 | 17.00 | 18.00 | — | 17.50 | 16.50 | 17.50 | — |
| | 3-methyl-1,3-butanediol | — | — | — | 15.00 | — | — | — | 15.00 |
| | 2-pyrrolidone | — | — | — | 2.00 | — | — | — | 2.00 |
| | glycerin | 18.00 | 17.00 | 18.00 | 15.00 | 17.50 | 16.50 | 17.50 | 15.00 |
| Penetrating agent | 2-ethyl-1,3-hexanediol | 2.00 | 2.00 | 2.00 | 2.00 | 2.00 | 2.00 | 2.00 | 2.00 |
| | 2,2,4-trimethyl-1,3-pentanediol | — | — | — | — | — | — | — | — |
| Surfactant | ZONYL FS-300 | — | — | — | — | 2.50 | 2.50 | 2.50 | 2.50 |
| | KF-634 | — | — | — | — | — | — | — | — |
| | SOFTANOL EP-7025 | 1.00 | 1.00 | 1.00 | 1.00 | — | — | — | — |
| Antifungal Agent | PROXEL GXL | 0.05 | 0.05 | 0.05 | 0.05 | 0.05 | 0.05 | 0.05 | 0.05 |
| Antifoaming agent | Silicone antifoaming agent KM-72F | 0.10 | 0.10 | 0.10 | 0.10 | 0.10 | 0.10 | 0.10 | 0.10 |
| pH adjuster | 2-amino-2-ethyl-1,3-propanediol | 0.30 | 0.30 | 0.30 | 0.40 | 0.30 | 0.30 | 0.30 | 0.40 |
| | Pure water | balance | balance | balance | balance | balance | balance | balance | balance |
| | Total (%) | 100 | 100 | 100 | 100 | 100 | 100 | 100 | 100 |

The abbreviations shown in Tables 1 and 2 are explained below.

CAB-O-JET300: a self-dispersible black pigment, manufactured by CABOT CORPORATION, a pigment solid content of 15%

Anionic ionomer-based aqueous urethane resin 1: HYDRAN APX-101H, manufactured by DIC Corporation, a polyester urethane resin, a solid content of 45%, a volume average particle diameter of 148 nm, a minimum film forming temperature (MFT)=20° C.

Anionic ionomer-based aqueous urethane resin 2: HYDRAN WLS-201, manufactured by DIC Corporation, a polyether urethane resin, a solid content of 35%, a volume average particle diameter of 26.5 nm, a minimum film forming temperature (MFT)=0° C. or lower Anionic ionomer-based aqueous urethane resin 3: HYDRAN HW-111, manufactured by DIC Corporation, a polyester urethane resin, a solid content of 45%, a volume average particle diameter of 65.3 nm, a minimum film forming temperature (MFT)=0° C. or lower Acryl-silicone resin emulsion: POLYSOL ROY6312, manufactured by SHOWA HIGHPOLYMER CO., LTD, a solid content of 40%, a volume average particle diameter of 171 nm, and a minimum film forming temperature (MFT) of 20° C.

ZONYL FS-300: polyoxyethylene perfluoroalkyl ether, manufactured by E.I. du Pont de Nemours & Company, a component of 40%

SOFTANOL EP-7025: polyoxyalkylene alkyl ether, manufactured by Nippon Shokubai Co., Ltd., a component of 100%

Proxel GXL: antifungal agent containing 1,2-benzisothiazolin-3-one as a main component, manufactured by Avecia Inc., a component of 20%, containing dipropylene glycol KM-72F: a self-emulsifiable silicone defoaming agent, manufactured by Shin-Etsu Chemical Co., Ltd., a component of 100%

Next, each of the prepared inks of Production Examples 1 to 16 was evaluated in terms of their physical properties in accordance with the following evaluation methods. The results are shown in Table 3.

<Volume Average Particle Diameter ($D_{50}$)>

The volume average particle diameter ($D_{50}$) of the ink was measured by means of a particle size measurement device (NANOTRAC UPA-EX150, manufactured by NIKKISO Co., Ltd.).

<Viscosity>

The viscosity of the ink was measured at 25° C. by means of a viscometer (RE-80L, manufactured by TOKI SANGYO CO., LTD.).

<Static Surface Tension>

The static surface tension of the ink was measured at 25° C. by means of an automatic surface tensiometer (CBVP-Z, manufactured by Kyowa Interface Science Co., Ltd.).

TABLE 3

| | Physical properties of ink | | |
|---|---|---|---|
| | Average particle diameter $D_{50}$ (nm) | Viscosity (mPa·s) | Static surface tension (mN/m) |
| Production Example 1 | 76.6 | 7.93 | 22.5 |
| Production Example 2 | 100.2 | 7.89 | 22.6 |
| Production Example 3 | 84.6 | 7.87 | 22.5 |

TABLE 3-continued

| | Physical properties of ink | | |
|---|---|---|---|
| | Average particle diameter $D_{50}$ (nm) | Viscosity (mPa · s) | Static surface tension (mN/m) |
| Production Example 4 | 108.0 | 7.91 | 22.3 |
| Production Example 5 | 106.5 | 8.18 | 25.0 |
| Production Example 6 | 102.4 | 8.10 | 24.7 |
| Production Example 7 | 91.6 | 8.19 | 24.6 |
| Production Example 8 | 112.4 | 8.24 | 24.6 |
| Production Example 9 | 106.5 | 8.18 | 32.3 |

Preparation Examples 7 to 15

Production of Pre-Treatment Liquid

Each of pre-treatment liquids was prepared in the manner described below.

At first, respective materials shown in Table 4 were stirred for 1 hour, to thereby obtain a uniform mixture. The resulting mixture was then subjected to pressure filtration using a polyvinylidene fluoride membrane filter having an average pore diameter of 5.0 µm to remove foreign particles such as insoluble matters, to thereby prepare each pre-treatment liquid of Preparation Examples 7 to 15.

TABLE 4

| | Component (%) | Number of carboxyl group | Preparation Example | | | | | | | | |
|---|---|---|---|---|---|---|---|---|---|---|---|
| | | | 7 | 8 | 9 | 10 | 11 | 12 | 13 | 14 | 15 |
| Carboxyl group-containing aliphatic organic acid | L-lactic acid (content: 85%) | 1 | 5.00 | — | — | 15.00 | — | — | — | — | 11.76 |
| | L(+)-tartaric acid | 2 | — | 10.00 | — | — | 20.00 | — | — | — | — |
| | DL-malic acid | 2 | — | — | 15.00 | — | — | 10.00 | — | — | — |
| Water-soluble organic amine compound | 3-amino-1-propanol | — | — | 10.01 | — | — | 20.02 | — | — | — | — |
| | 2-amino-2-ethyl-1,3-propanediol | — | 6.61 | — | 26.66 | — | — | 17.77 | — | — | — |
| | N,N-diethylethanolamine | — | — | — | — | 23.42 | — | — | — | — | — |
| Inorganic metal salt compound | magnesium sulfate | — | — | — | — | — | — | — | — | 10.00 | — |
| | calcium nitrate | — | — | — | — | — | — | — | 10.00 | — | — |
| Wetting agent | 3-methyl-1,3-butanediol | — | — | 10.00 | 15.00 | — | 5.00 | 5.00 | 10.00 | 20.00 | 10.00 |
| | glycerin | — | 15.00 | 15.00 | 10.00 | — | 20.00 | 10.00 | 15.00 | 10.00 | 20.00 |
| Penetrating agent | 2-ethyl-1,3-hexanediol | — | 2.00 | 1.00 | 1.00 | — | — | 1.00 | 1.00 | — | 2.00 |
| Surfactant | ZONYL FS-300 | — | — | — | — | 2.50 | — | — | 2.50 | — | — |
| | FUTARGENT 251 | — | — | — | 1.00 | — | — | 1.00 | — | 1.00 | — | 0.50 |
| | KF-643 | — | — | — | — | — | 1.00 | — | — | — | — |
| Antifungal agent | Proxel GXL | — | 0.05 | 0.05 | 0.05 | 0.05 | 0.05 | 0.05 | 0.05 | 0.05 | 0.05 |
| Anti-rust agent | 1,2,3-benzotriazol | — | 0.10 | 0.10 | 0.10 | 0.10 | 0.10 | 0.10 | 0.10 | 0.10 | 0.10 |
| | Pure water | — | Balance | Balance | Balance | Balance | Balance | Balance | Balance | Balance | Balance |
| | Total (%) | — | 100 | 100 | 100 | 100 | 100 | 100 | 100 | 100 | 100 |

TABLE 3-continued

| | Physical properties of ink | | |
|---|---|---|---|
| | Average particle diameter $D_{50}$ (nm) | Viscosity (mPa · s) | Static surface tension (mN/m) |
| Production Example 10 | 102.4 | 8.22 | 32.4 |
| Production Example 11 | 91.6 | 8.09 | 32.5 |
| Production Example 12 | 112.4 | 8.22 | 31.9 |
| Production Example 13 | 116.3 | 8.21 | 24.9 |
| Production Example 14 | 130.2 | 8.28 | 25.1 |
| Production Example 15 | 124.8 | 8.29 | 25.0 |
| Production Example 16 | 135.2 | 8.32 | 25.2 |

The abbreviations in Table 4 are as follows.

L-lactic acid: manufactured by TOKYO CHEMICAL INDUSTRY CO., LTD., purity of 85% or higher, having 3 carbon atoms L(+)-tartaric acid: manufactured by KANTO CHEMICAL CO., INC., purity of 99.5% or higher, having 4 carbon atoms DL-malic acid: manufactured by KANTO CHEMICAL CO., INC., purity of 99% or higher, having 5 carbon atoms ZONYL FS-300: polyoxyethylene perfluoroalkyl ether, manufactured by E.I. du Pont de Nemours & Company, a component of 40%

KF-643: polyether-modified silicone surfactant, manufactured by Shin-Etsu Chemical Co., Ltd., a component of 100%

FUTARGENT 251: branched perfluoroalkenyl group-containing fluorosurfactant, manufactured by NEOS COMPANY LIMITED, a component of 100%

Proxel GXL: antifungal agent containing 1,2-benzisothiazolin-3-one as a main component, manufactured by Avecia Co., a component of 20%, containing dipropylene glycol The physical properties of the pre-treatment liquids of Preparation Examples 7 to 15 are shown in Table 5. Note that, the ratio of the organic amine to the organic acid was calculated using the following equation. The static surface tension was measured at 25° C. by means of an automatic surface tensiometer (CBVP-Z, manufactured by Kyowa Interface Science Co., Ltd.).

$$\text{Ratio of organic amine to organic acid} = \frac{\text{The number of moles of water-soluble organic monoamine compound}}{\text{The number of moles of water-soluble aliphatic organic acid} \times \text{The number of acid groups contained per molecule of water-soluble aliphatic organic acid}}$$

6 in an adhesion amount on wet basis shown in Table 6 by a roll coating method, and then naturally dried.

—Ink-Jetting Step—

In an adjusted environment where the temperature was 23° C.±2° C. and the relative humidity was 50%±5%, in an inkjet printer IPSIO GX5000 (manufactured by Ricoh Company, Ltd.), the drive voltage of a piezo element was changed so as to uniformly eject an ink and to make the ink adhere in the same amount to a recording medium.

Next, the print mode of the inkjet printer was set to the "Gloss Paper_Fine", and the recording medium and the inkset described in Table 6 were used to form an image. Thereafter, the formed image was dried with hot air and fixed once.

TABLE 6

| | | | Pre-treatment step | | | | Ink jetting step (Image formation) | |
|---|---|---|---|---|---|---|---|---|
| | Recording medium | Manufacture | Pre-treatment liquid | Adhesion amount (wet basis) | Coating method | Drying method | Inkset | GX5000 printing mode |
| Ex. 1 | Type 6200 | Ricoh Company, Ltd. | Preparation Example 7 | 1.6 g/m² | roll coating | natural drying | Production Example 5-8 | Gloss Paper_Fine |
| Ex. 2 | Type 6200 | Ricoh Company, Ltd. | Preparation Example 8 | 1.6 g/m² | roll coating | natural drying | Production Example 5-8 | Gloss Paper_Fine |
| Ex. 3 | Type 6200 | Ricoh Company, Ltd. | Preparation Example 9 | 0.8 g/m² | roll coating | natural drying | Production Example 9-12 | Gloss Paper_Fine |
| Ex. 4 | Type 6200 | Ricoh Company, Ltd. | Preparation Example 10 | 0.8 g/m² | roll coating | natural drying | Production Example 5-8 | Gloss Paper_Fine |
| Ex. 5 | Type 6200 | Ricoh Company, Ltd. | Preparation Example 11 | 0.8 g/m² | roll coating | natural drying | Production Example 9-12 | Gloss Paper_Fine |
| Ex. 6 | Type 6200 | Ricoh Company, Ltd. | Preparation Example 12 | 0.8 g/m² | roll coating | natural drying | Production Example 5-8 | Gloss Paper_Fine |
| Comp. Ex. 1 | Type 6200 | Ricoh Company, Ltd. | — | — | — | — | Production Example 5-8 | Gloss Paper_Fine |
| Comp. Ex. 2 | Type 6200 | Ricoh Company, Ltd. | Preparation Example 7 | 1.6 g/m² | roll coating | natural drying | Production Example 1-4 | Gloss Paper_Fine |
| Comp. Ex. 3 | Type 6200 | Ricoh Company, Ltd. | Preparation Example 7 | 1.6 g/m² | roll coating | natural drying | Production Example 13-16 | Gloss Paper_Fine |
| Comp. Ex. 4 | Type 6200 | Ricoh Company, Ltd. | Preparation Example 13 | 0.8 g/m² | roll coating | natural drying | Production Example 5-8 | Gloss Paper_Fine |
| Comp. Ex. 5 | Type 6200 | Ricoh Company, Ltd. | Preparation Example 14 | 0.8 g/m² | roll coating | natural drying | Production Example 5-8 | Gloss Paper_Fine |
| Comp. Ex. 6 | Type 6200 | Ricoh Company, Ltd. | Preparation Example 15 | 0.8 g/m² | roll coating | natural drying | Production Example 5-8 | Gloss Paper_Fine |

TABLE 5

| | Ratio of organic amine to organic acid | pH | Static surface tension (mN/m) |
|---|---|---|---|
| Preparation Example 7 | 1.18 | 8.11 | 52.6 |
| Preparation Example 8 | 1.0 | 7.41 | 22.8 |
| Preparation Example 9 | 1.0 | 7.55 | 22.4 |
| Preparation Example 10 | 1.4 | 8.72 | 21.6 |
| Preparation Example 11 | 1.0 | 7.69 | 23.5 |
| Preparation Example 12 | 1.0 | 7.83 | 24.3 |
| Preparation Example 13 | — | 3.01 | 21.6 |
| Preparation Example 14 | — | 7.04 | 55.2 |
| Preparation Example 15 | 0.0 | 1.80 | 22.2 |

<Image Formation>

—Pre-Treatment Step—

Each of the pre-treatment liquids of Preparation Examples 7 to 15 was applied to the recording medium shown in Table —Preparation of Printing Evaluation—

In an adjusted environment where the temperature was 23° C.±0.5° C. and the relative humidity was 50%±5%, in an inkjet printer IPSIO GX5000 (manufactured by Ricoh Company, Ltd.), in which each of the inks of Examples 1 to 6 and Comparative Examples 1 to 6 was set, the drive voltage of a piezoelectric element was changed so as to uniformly eject an ink and to make the ink adhere in the same amount to a recording medium (plain paper, Type 6200, manufactured by Ricoh Company, Ltd.). Under these conditions, image density, color saturation, feathering, color bleeding, smear adhesion, and drying properties were evaluated as follows.

<Image Density>

A chart, on which a symbol "■" (solid square image) of 64 point was formed using MICROSOFT WORD 2000 (manufactured by Microsoft), was printed on a recording medium (plain paper, Type 6200, manufactured by Ricoh Company, Ltd.), and the density of the image "■" on the printed surface was measured using X-Rite 939 (manufactured by X-Rite). The results were evaluated based on the following evaluation criteria. As for the printing mode, "Plan paper_Fine" mode was changed to "No Color Correction" mode in user settings for plain paper by using a driver residing in a printer. The image density was evaluated in such a manner that one color which was evaluated worst based on the following criteria among four colors was regarded as the evaluation result shown in Table 7.

[Evaluation Criteria]
A: 1.4 or higher in Black,
0.85 or higher in Yellow,
1.05 or higher in Magenta, or
1.1 or higher in Cyan.
B: 1.3 or higher but lower than 1.4 in Black,
0.8 or higher but lower than 0.85 in Yellow,
1.0 or higher but lower than 1.05 in Magenta, or
1.0 or higher but lower than 1.1 in Cyan.
C: lower than 1.3 in Black,
lower than 0.8 in Yellow,
lower than 1.0 in Magenta, or
lower than 1.0 in Cyan.

<Color Saturation>

A chart formed in the same manner as the sample for the aforementioned test for image density, was printed on a recording medium (plain paper, Type 6200, manufactured by Ricoh Company, Ltd.), and the image "■" on the printed surface was measured using X-Rite 939. The results were evaluated based on the following evaluation criteria. The printing was performed in "Plain Paper_Standard, Fast" mode using a driver residing in a printer.

Then, the obtained values for the saturation was calculated to obtain a ratio to the saturation values (Yellow: 91.34, Magenta: 74.55, Cyan: 62.82) of the standard color (Japan color ver. 2), and the results were evaluated based on the following evaluation criteria.

[Evaluation Criteria]
A: 0.85 or more
B: 0.80 or more but less than 0.85
C: 0.75 or more but less than 0.80
D: less than 0.75

<Feathering>

A chart, on which the Chinese character shown below of 6 point was formed using MICROSOFT WORD 2000, was printed on a recording medium (plain paper, Type 6200, manufactured by Ricoh Company, Ltd.), and occurrence of feathering at the portion of the character on the recorded surface was visually observed, and evaluated based on the following evaluation criteria.

轟

[Evaluation Criteria]
A: No problem at all.
B: Very slightly occurred, but no problem.
C: Slightly occurred and it was problematic.
D: Occurred and it was problematic.

<Color Bleeding>

Using a recording medium (plain paper, Type 6200, manufactured by Ricoh Company, Ltd.), 0.5-mm line images for each color of magenta, cyan and black were formed on a yellow solid image, occurrence of bleeding at color boundary, "bleeding between different colors", where different color inks were disposed adjacent to each other, was visually observed and evaluated based on the following evaluation criteria. Similarly to the above, when 0.5-mm line images for each color of magenta, yellow and black were formed on a cyan solid image, and when 0.5-mm line images for each color of cyan, yellow and black were formed on a magenta solid image were also visually observed for presence or absence of bleeding at the color boundary.

[Evaluation Criteria]
A: No problem at all.
B: Very slightly occurred, but no problem.
C: Slightly occurred and it was problematic.
D: Occurred and it was problematic.

<Smear Adhesion (Rubfastness)>

A chart including a monochrome solid image in the size of 3 cm squares produced using MICROSOFT WORD 2000 was printed on a recording medium (plain paper, Type 6200, manufactured by Ricoh Company, Ltd.), and then dried at a temperature of 23° C.±1° C. and a relative humidity of 50%±10% for 5 min. The monochrome solid image on the printing surface was rubbed back and forth 5 times with cotton No. 3 (conforming to JIS L0803 standard) attached to a CM-1 clock meter using a double-faced adhesive. The amount of transferred ink from the solid image to that cotton was measured using X-Rite 938. The original color of that cotton was eliminated for obtaining the density. Based on the measured amount, the density of the transferred ink on the cotton was obtained and evaluated based on the following evaluation criteria.

[Evaluation Criteria]
A: less than 0.03
B: 0.03 or greater but less than 0.07
C: 0.07 or greater but less than 0.10
D: 0.10 or greater <Drying Properties>

A chart including a monochrome solid image in the size of 3 cm squares produced using MICROSOFT WORD 2000 was printed on a recording medium (plain paper, Type 6200, manufactured by Ricoh Company, Ltd.). Immediately after printing, filter paper was brought into contact with the monochrome solid image on the surface of the recording medium, and then the drying properties was evaluated according to presence or absence of transfer of the ink.

[Evaluation Criteria]
A: No transfer smear was observed.
B: Slightly transfer smear was observed.
C: Transfer smear was observed.

The evaluation results are shown in Table 7. The inks were evaluated for each color based on the evaluation criteria described above. Note that as for the results of evaluation items, the most common evaluation grade was described as the result. When the number of evaluation grades was equal, for example, in the case of two grade Bs and two grade Cs, the better grade was described as the result.

TABLE 7

| | Evaluation results | | | | | |
|---|---|---|---|---|---|---|
| | Image density | Color saturation | Feathering | Color bleeding | Smear adhesion | Drying properties |
| Ex. 1 | A | A | A | A | B | B |
| Ex. 2 | A | A | A | A | A | A |
| Ex. 3 | A | A | A | A | B | B |
| Ex. 4 | A | A | A | A | A | A |
| Ex. 5 | A | A | A | A | B | B |
| Ex. 6 | A | A | A | A | A | A |
| Comp. Ex. 1 | C | D | C | C | A | A |
| Comp. Ex. 2 | C | D | C | D | C | A |

TABLE 7-continued

| | Evaluation results | | | | | |
|---|---|---|---|---|---|---|
| | Image density | Color saturation | Feathering | Color bleeding | Smear adhesion | Drying properties |
| Comp. Ex. 3 | C | D | C | B | B | B |
| Comp. Ex. 4 | A | A | A | A | D | C |
| Comp. Ex. 5 | A | A | A | A | D | C |
| Comp. Ex. 6 | A | A | A | A | D | B |

INDUSTRIAL APPLICABILITY

The image forming method and image formed matter of the present invention can be used for various recording by an inkjet recording method.

REFERENCE SIGNS LIST 1 pre-treatment liquid
2 film thickness control roller
3 scoop roller
4 application roller
5 counter roller
6, 17 recording medium
7, 18 paper feeding roller
8 paper feeding tray
10 recording medium holding roller
11, 12, 13, 14, 15, 16 recording medium conveying roller
20 inkjet recording head
21 ink cartridge
22 carriage shaft
23 carriage
31 recording medium guide
32, 33 recording medium conveying roller
34 recording medium return guide
35 conveying path switch guide

The invention claimed is:

1. An image forming method comprising:
applying a pre-treatment liquid to a recording medium; and
applying a stimulus to an inkjet ink to jet the inkjet ink onto the recording medium, onto which the pre-treatment liquid has been applied, to form an image on the recording medium,
wherein the pre-treatment liquid comprises a water-soluble aliphatic organic acid, a water-soluble organic monoamine compound, a water-soluble organic solvent, and water,
the inkjet ink comprises an aqueous pigment dispersion in which a pigment is dispersed with an anionic dispersant or nonionic dispersant, a water-soluble organic solvent, an anionic ionomer-based aqueous urethane resin, a surfactant, a penetrating agent, and water, and
the pre-treatment liquid comprises 1 molar equivalent or higher of the water-soluble organic monoamine compound relative to an acid group of the water-soluble aliphatic organic acid.

2. The image forming method according to claim 1, wherein the anionic ionomer-based aqueous urethane resin is a polyester urethane resin, or a polyether urethane resin.

3. The image forming method according to claim 1, wherein the water-soluble aliphatic organic acid is a compound of Formula (I):

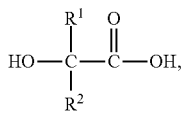

Formula (I)

wherein $R^1$ is a hydrogen atom or a methyl group substituted by a carboxyl group; and
$R^2$ is a methyl group, a methyl group substituted by a carboxyl group, or a methyl group substituted by a hydroxyl group and a carboxyl group.

4. The image forming method according to claim 3, wherein the water-soluble aliphatic organic acid is at least one selected from the group consisting of lactic acid, malic acid, citric acid, and tartaric acid.

5. The image forming method according to claim 1,
wherein the water-soluble organic monoamine compound is at least one selected from the group consisting of a compound of Formula (IV):

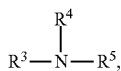

Formula (IV)

wherein $R^3$, $R^4$, and $R^5$ are each independently a hydrogen atom, an alkoxy group comprising 1 to 4 carbon atoms, an alkyl group comprising 1 to 8 carbon atoms, a hydroxyethyl group or a hydroxypropyl group, with the proviso that a compound in which all of $R^3$, $R^4$, and $R^5$ are hydrogen atoms is excluded, and
a compound of Formula V:

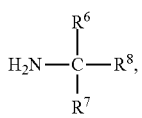

General Formula (V)

wherein $R^6$ is a hydroxymethyl group;
$R^7$ is a methyl group, an ethyl group or a hydroxymethyl group; and
$R^8$ is a hydrogen atom, an alkyl group comprising 1 to 4 carbon atoms or a hydroxymethyl group.

6. The image forming method according to claim 5, wherein the water-soluble organic monoamine compound is a compound of Formula (IV),
wherein the organic monoamine compound is at least one selected from the group consisting of dimethylamine, ethylamine, diethylamine, triethylamine, propylamine, dipropylamine, isopropylamine, diisopropylamine, n-butylamine, sec-butylamine, t-butylamine, di-n-butylamine, tributylamine, pentylamine, dipentylamine, tripentylamine, 2-ethylhexylamine, di-2-ethylhexylamine, di-n-octylamine, tri-n-octylamine, 1-amino-2-propanol, 3-amino-1-propanol, N-methylethanolamine, N,N-diethylethanolamine, N,N-dimethylethanolamine, N-methyldiethanolamine, diethanolamine, triethanolamine, triisopropanolamine, N-butyldiethanolamine, and N,N-dibutylethanolamine.

7. The image forming method according to claim 5, wherein the water-soluble organic monoamine compound is a compound of Formula (V),
wherein the organic monoamine compound is at least one selected from the group consisting of 2-amino-2-ethyl-1,3-propanediol, 2-amino-2-(hydroxymethyl)-1,3-propanediol, 2-amino-2-methyl-1,3-propanediol, and 2-amino-2-methyl-1-propanol.

8. The image forming method according to claim 1, wherein the pre-treatment liquid further comprises an aliphatic organic acid salt compound or an inorganic metal salt compound.

9. The image forming method according to claim 1, wherein the pre-treatment liquid has a static surface tension of 30 mN/m or lower at 25° C.

10. The image forming method according to claim 1, wherein the inkjet ink has a static surface tension of from 20 mN/m to 35 mN/m at 25° C.

11. The image forming method according to claim 1, wherein the water-soluble aliphatic organic acid comprises a carboxyl group or a sulfo group.

12. The image forming method according to claim 1, wherein an amount of the water-soluble aliphatic organic acid in a total amount of the pre-treatment liquid is from 1% to 40% by mass.

13. The image forming method according to claim 1, wherein an amount of the water-soluble aliphatic organic acid in a total amount of the pre-treatment liquid is from 3% to 30% by mass.

14. The image forming method according to claim 1, wherein the pre-treatment liquid comprises 1.0 to 1.5 mol of the water-soluble organic monoamine compound relative to the acid group of the water-soluble aliphatic organic acid.

15. The image forming method according to claim 1, wherein the pre-treatment liquid comprises 1.0 to 1.2 mol of the water-soluble organic monoamine compound relative to the acid group of the water-soluble aliphatic organic acid.

16. The image forming method according to claim 1, wherein the water-soluble organic solvent of the pre-treatment liquid is at least one selected from the group consisting of a polyhydric alcohol, a polyhydric alcohol alkyl ether, a polyhydric alcohol aryl ether, a heterocyclic compound comprising nitrogen, an amide, an amine, a compound comprising sulfur, a propylene carbonate, and an ethylene carbonate.

17. The image forming method according to claim 1, wherein the surfactant is at least one selected from the group consisting of a nonionic surfactant, an anionic surfactant, a betaine surfactant, a silicone surfactant, and a fluorochemical surfactant.

18. The image forming method according to claim 17, wherein the surfactant is at least one selected from the group consisting of a silicone surfactant and a fluorochemical surfactant.

19. The image forming method according to claim 1, wherein the pre-treatment liquid has a pH value of from 5 to 9.5.

20. An image formed matter, comprising:
a recording medium; and
an image formed on the recording medium,
wherein the image is formed on the recording medium by an image forming method comprising:
applying a pre-treatment liquid to the recording medium; and
applying a stimulus to an inkjet ink to jet the ink onto the recording medium, onto which the pre-treatment liquid has been applied, to form an image on the recording medium,
wherein the pre-treatment liquid comprises a water-soluble aliphatic organic acid, a water-soluble monoamine compound, a water-soluble organic solvent, and water,
the inkjet comprises an aqueous pigment dispersion in which a pigment is dispersed with an anionic dispersant or nonionic dispersant, a water-soluble organic solvent, an anionic ionomer-based aqueous urethane resin, a surfactant, a penetrating agent, and water, and
the pre-treatment liquid comprises 1 molar equivalent or higher of the water-soluble organic monoamine compound relative to an acid group of the water-soluble aliphatic organic acid.

* * * * *